US012737108B2

(12) United States Patent
Behzadi et al.

(10) Patent No.: US 12,737,108 B2
(45) Date of Patent: Sep. 15, 2026

(54) USER INTERFACES FOR PERFORMING OPERATIONS

(71) Applicant: Apple Inc., Cupertino, CA (US)

(72) Inventors: Arian Behzadi, San Francisco, CA (US); Christopher P. Foss, San Francisco, CA (US); Andrew S. Kim, Walnut Creek, CA (US); David A. Krimsley, Sunnyvale, CA (US); Christopher D. Matthews, San Francisco, CA (US); Corey K. Wang, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/896,605

(22) Filed: Sep. 25, 2024

(65) Prior Publication Data

US 2025/0110637 A1 Apr. 3, 2025

Related U.S. Application Data

(60) Provisional application No. 63/541,806, filed on Sep. 30, 2023, provisional application No. 63/541,820, filed on Sep. 30, 2023, provisional application No. 63/541,815, filed on Sep. 30, 2023.

(51) Int. Cl.

| | |
|---|---|
| ***G06F 3/0487*** | (2013.01) |
| ***G06F 3/0362*** | (2013.01) |
| ***G06F 3/04842*** | (2022.01) |
| ***G06F 3/04845*** | (2022.01) |
| ***G06F 3/04847*** | (2022.01) |

(52) U.S. Cl.

CPC .......... *G06F 3/0487* (2013.01); *G06F 3/0362* (2013.01); *G06F 3/04842* (2013.01); *G06F 3/04845* (2013.01); *G06F 3/04847* (2013.01)

(58) Field of Classification Search

CPC .. G06F 3/0487; G06F 3/0362; G06F 3/04842; G06F 3/04845; G06F 3/04847

See application file for complete search history.

(56) References Cited

U.S. PATENT DOCUMENTS

| | | |
|---|---|---|
| 11,553,070 B2 | 1/2023 | Hulbert et al. |
| 2014/0075075 A1 | 3/2014 | Morrill et al. |
| 2014/0118107 A1 | 5/2014 | Almomani |
| 2014/0207282 A1 | 7/2014 | Angle et al. |

(Continued)

FOREIGN PATENT DOCUMENTS

| | | |
|---|---|---|
| CN | 117092921 A | 11/2023 |
| EP | 2466910 A2 | 6/2012 |

(Continued)

OTHER PUBLICATIONS

International Patent Application No. PCT/US2024/049120; Invitation to Pay Add'l Fees; dated Dec. 9, 2024; 18 pages.

(Continued)

*Primary Examiner* — Kenneth B Lee, Jr.

(74) *Attorney, Agent, or Firm* — Kyle B. Morse; Anthony R. McCain; BAKERHOSTETLER

(57) ABSTRACT

The present disclosure generally relates to user interfaces and techniques for performing one or more operations in accordance with some examples, such as displaying user interfaces and/or configuring a device to perform a respective operation.

39 Claims, 6 Drawing Sheets

(56) References Cited

U.S. PATENT DOCUMENTS

| | | | | |
|---|---|---|---|---|
| 2015/0339031 | A1* | 11/2015 | Zeinstra | B60K 35/10 715/747 |
| 2016/0257198 | A1 | 9/2016 | Buttolo et al. | |
| 2017/0052666 | A1 | 2/2017 | Wang et al. | |
| 2017/0132863 | A1 | 5/2017 | Ahearn et al. | |
| 2018/0062691 | A1 | 3/2018 | Barnett, Jr. | |
| 2018/0356946 | A1 | 12/2018 | Chou et al. | |
| 2018/0364665 | A1 | 12/2018 | Clymer et al. | |
| 2019/0034043 | A1 | 1/2019 | Zolotykh et al. | |
| 2019/0369699 | A1 | 12/2019 | Pathak et al. | |
| 2019/0372345 | A1 | 12/2019 | Bain et al. | |
| 2020/0077483 | A1 | 3/2020 | Agarwal et al. | |
| 2020/0341553 | A1 | 10/2020 | Moussette et al. | |
| 2020/0348822 | A1 | 11/2020 | Dascola et al. | |
| 2020/0379730 | A1 | 12/2020 | Graham et al. | |
| 2021/0084733 | A1 | 3/2021 | Hamm et al. | |
| 2021/0191600 | A1* | 6/2021 | Lemay | G06F 3/013 |
| 2021/0286487 | A1 | 9/2021 | Tyler et al. | |
| 2022/0053230 | A1 | 2/2022 | Tchedikian et al. | |
| 2022/0075328 | A1 | 3/2022 | Taylor et al. | |
| 2022/0083182 | A1* | 3/2022 | Zamora Duran | G06F 1/1671 |
| 2022/0269333 | A1* | 8/2022 | Dedonato | G04G 21/025 |
| 2022/0300079 | A1 | 9/2022 | Jakes et al. | |
| 2023/0018372 | A1 | 1/2023 | Ackmann et al. | |
| 2023/0076716 | A1 | 3/2023 | Dogrusoz et al. | |
| 2023/0148149 | A1 | 5/2023 | Davis et al. | |
| 2023/0152906 | A1* | 5/2023 | Jorasch | G06F 3/038 345/156 |
| 2023/0343200 | A1 | 10/2023 | Carrigan et al. | |
| 2024/0087383 | A1 | 3/2024 | McLachlan et al. | |
| 2025/0139178 | A1 | 5/2025 | Colflesh et al. | |

FOREIGN PATENT DOCUMENTS

| | | | |
|---|---|---|---|
| EP | 3410263 | A1 | 12/2018 |
| EP | 4290858 | A2 | 12/2023 |
| EP | 4492166 | A1 | 1/2025 |
| KR | 2006-0098081 | A | 9/2006 |
| KR | 102240390 | B1 | 4/2021 |
| WO | WO 2020/243691 | A1 | 12/2020 |
| WO | WO 2022/066177 | A1 | 3/2022 |

OTHER PUBLICATIONS

International Patent Application No. PCT/US2024/049119; Invitation to Pay Add'l Fees; dated Dec. 18, 2024; 21 pages.

International Patent Application No. PCT/US2024/049128; Invitation to Pay Add'l Fees; dated Jan. 10, 2025; 25 pages.

International Patent Application No. PCT/US2024/049024; Invitation to Pay Add'l Fees; dated Jan. 17, 2025; 13 pages.

International Patent Application No. PCT/US2024/049120; Int'l Search Report and the Written Opinion; dated Jan. 30, 2025; 10 pages.

International Patent Application No. PCT/US2024/049119; Int'l Search Report and the Written Opinion; dated Feb. 10, 2025; 29 pages.

International Patent Application No. PCT/US2024/049128; Int'l Search Report and the Written Opinion; dated Mar. 3, 2025; 34 pages.

International Patent Application No. PCT/US2024/049024; Int'l Search Report and the Written Opinion; dated Mar. 10, 2025; 20 pages.

International Patent Application No. PCT/US2025/025991; Pay Add'l Fees; dated Jul. 22, 2025; 13 pages.

International Patent Application No. PCT/US2025/032479; Pay Add'l Fees; dated Sep. 11, 2025; 15 pages.

International Patent Application No. PCT/US2025/025991; Int'l Search Report and the Written Opinion; dated Sep. 12, 2025; 19 pages.

S. Writtenhouse; "How to set up and check the status of your HomeKit hubs"; https://www.idownloadblog.com/2020/02/17/set-up-check-status-homekit-hubs/; iDownloadBlog; May 2024; accessed Sep. 3, 2025; 10 pages.

International Patent Application No. PCT/US2025/032487; Invitation to Pay Add'l Fees; Sep. 18, 2025; 12 pages.

International Patent Application No. PCT/US2025/032883; Int'l Search Report and the Written Opinion; dated Oct. 13, 2025; 12 pages.

International Patent Application No. PCT/US2025/032479; Int'l Search Report and the Written Opinion; dated Nov. 3, 2025; 22 pages.

U.S. Appl. No. 18/895,597; Final Office Action; dated Nov. 3, 2025; 28 pages.

International Patent Application No. PCT/US2025/032899; Invitation to Pay Add'l Fees; dated Nov. 3, 2025; 12 pages.

International Patent Application No. PCT/US2025/032487; Int'l Search Report and the Written Opinion; dated Nov. 10, 2025; 8 pages.

U.S. Appl. No. 18/895,597; Non-Final Office Action; dated Jun. 5, 2025; 24 pages.

International Patent Application No. PCT/US2023/033560; Int'l Search Report and the Written Opinion; dated Jan. 5, 2024; 14 pages.

U.S. Appl. No. 18/896,500; Non-Final Office Action; dated Jun. 17, 2025; 10 pages.

* cited by examiner

USER INTERFACES FOR PERFORMING OPERATIONS

CROSS-REFERENCE TO RELATED APPLICATIONS

This application claims priority to U.S. Provisional Patent Application Ser. No. 63/541,806 entitled "USER INTERFACES FOR PERFORMING OPERATIONS," filed Sep. 30, 2023, to U.S. Provisional Patent Application Ser. No. 63/541,820 entitled "TECHNIQUES FOR CONTROLLING A DEVICE," filed Sep. 30, 2023, and to U.S. Provisional Patent Application Ser. No. 63/541,815 entitled "TECHNIQUES FOR DISPLAYING DIFFERENT CONTROLS," filed Sep. 30, 2023, which are incorporated by reference herein in their entireties for all purposes.

FIELD

The present disclosure relates generally to computer user interfaces and, more specifically, to techniques for performing operations based on context associated with a computer system.

BACKGROUND

Computer systems often display user interface objects based on context associated with a computer system. The computer system can cause actions to be performed in response to detecting that a respective user interface object is selected.

SUMMARY

Some techniques for performing operations based on context associated with a computer system, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides computer systems with faster, more efficient methods and interfaces for performing operations based on context associated with a computer system. Such methods and interfaces optionally complement or replace other methods for performing operations based on context associated with a computer system. Such methods and interfaces reduce the cognitive burden on a user and produce a more efficient human-machine interface. For battery-operated computing devices, such methods and interfaces conserve power and increase the time between battery charges.

In some embodiments, a method that is performed at a computer system that is in communication with a display component is described. In some embodiments, the method comprises: detecting presence of a user; and in response to detecting the presence of the user: in accordance with a determination that the computer system will be moving within a predetermined period of time after the presence of the user was detected, displaying, via the display component, a user interface that includes a first set of one or more controls corresponding to a first type of setting; and in accordance with a determination that the computer system will not be moving within the predetermined period of time after the presence of the user was detected, displaying, via the display component, a user interface that includes a second set of one or more controls corresponding to a second type of setting that is different from the first type of setting, wherein the first set of one or more controls is different from the second set of one or more controls.

In some embodiments, a non-transitory computer-readable storage medium storing one or more programs configured to be executed by one or more processors of a computer system that is in communication with a display component is described. In some embodiments, the one or more programs includes instructions for: detecting presence of a user; and in response to detecting the presence of the user: in accordance with a determination that the computer system will be moving within a predetermined period of time after the presence of the user was detected, displaying, via the display component, a user interface that includes a first set of one or more controls corresponding to a first type of setting; and in accordance with a determination that the computer system will not be moving within the predetermined period of time after the presence of the user was detected, displaying, via the display component, a user interface that includes a second set of one or more controls corresponding to a second type of setting that is different from the first type of setting, wherein the first set of one or more controls is different from the second set of one or more controls.

In some embodiments, a transitory computer-readable storage medium storing one or more programs configured to be executed by one or more processors of a computer system that is in communication with a display component is described. In some embodiments, the one or more programs includes instructions for: detecting presence of a user; and in response to detecting the presence of the user: in accordance with a determination that the computer system will be moving within a predetermined period of time after the presence of the user was detected, displaying, via the display component, a user interface that includes a first set of one or more controls corresponding to a first type of setting; and in accordance with a determination that the computer system will not be moving within the predetermined period of time after the presence of the user was detected, displaying, via the display component, a user interface that includes a second set of one or more controls corresponding to a second type of setting that is different from the first type of setting, wherein the first set of one or more controls is different from the second set of one or more controls.

In some embodiments, a computer system that is in communication with a display component is described. In some embodiments, the computer system that is in communication with a display component comprises one or more processors and memory storing one or more programs configured to be executed by the one or more processors. In some embodiments, the one or more programs includes instructions for: detecting presence of a user; and in response to detecting the presence of the user: in accordance with a determination that the computer system will be moving within a predetermined period of time after the presence of the user was detected, displaying, via the display component, a user interface that includes a first set of one or more controls corresponding to a first type of setting; and in accordance with a determination that the computer system will not be moving within the predetermined period of time after the presence of the user was detected, displaying, via the display component, a user interface that includes a second set of one or more controls corresponding to a second type of setting that is different from the first type of setting, wherein the first set of one or more controls is different from the second set of one or more controls.

In some embodiments, a computer system that is in communication with a display component is described. In some embodiments, the computer system that is in communication with a display component comprises means for performing each of the following steps: detecting presence of a user; and in response to detecting the presence of the user: in accordance with a determination that the computer system will be moving within a predetermined period of time after the presence of the user was detected, displaying, via the display component, a user interface that includes a first set of one or more controls corresponding to a first type of setting; and in accordance with a determination that the computer system will not be moving within the predetermined period of time after the presence of the user was detected, displaying, via the display component, a user interface that includes a second set of one or more controls corresponding to a second type of setting that is different from the first type of setting, wherein the first set of one or more controls is different from the second set of one or more controls.

In some embodiments, a computer program product is described. In some embodiments, the computer program product comprises one or more programs configured to be executed by one or more processors of a computer system that is in communication with a display component. In some embodiments, the one or more programs include instructions for: detecting presence of a user; and in response to detecting the presence of the user: in accordance with a determination that the computer system will be moving within a predetermined period of time after the presence of the user was detected, displaying, via the display component, a user interface that includes a first set of one or more controls corresponding to a first type of setting; and in accordance with a determination that the computer system will not be moving within the predetermined period of time after the presence of the user was detected, displaying, via the display component, a user interface that includes a second set of one or more controls corresponding to a second type of setting that is different from the first type of setting, wherein the first set of one or more controls is different from the second set of one or more controls.

In some embodiments, a method that is performed at a computer system that is in communication with a display component and a physical input mechanism is described. In some embodiments, the method comprises: detecting presence of a user; and in response to detecting the presence of the user: in accordance with a determination that the computer system will be moving within a predetermined period of time after the presence of the user was detected, configuring the physical input mechanism to cause a first operation to be performed in response to detecting input directed to the physical input mechanism; and in accordance with a determination that the computer system will not be moving within the predetermined period of time after the presence of the user was detected, configuring the physical input mechanism to cause a second operation to be performed in response to detecting the input directed to the physical input mechanism, wherein the second operation is different from the first operation.

In some embodiments, a non-transitory computer-readable storage medium storing one or more programs configured to be executed by one or more processors of a computer system that is in communication with a display component and a physical input mechanism is described. In some embodiments, the one or more programs includes instructions for: detecting presence of a user; and in response to detecting the presence of the user: in accordance with a determination that the computer system will be moving within a predetermined period of time after the presence of the user was detected, configuring the physical input mechanism to cause a first operation to be performed in response to detecting input directed to the physical input mechanism; and in accordance with a determination that the computer system will not be moving within the predetermined period of time after the presence of the user was detected, configuring the physical input mechanism to cause a second operation to be performed in response to detecting the input directed to the physical input mechanism, wherein the second operation is different from the first operation.

In some embodiments, a transitory computer-readable storage medium storing one or more programs configured to be executed by one or more processors of a computer system that is in communication with a display component and a physical input mechanism is described. In some embodiments, the one or more programs includes instructions for: detecting presence of a user; and in response to detecting the presence of the user: in accordance with a determination that the computer system will be moving within a predetermined period of time after the presence of the user was detected, configuring the physical input mechanism to cause a first operation to be performed in response to detecting input directed to the physical input mechanism; and in accordance with a determination that the computer system will not be moving within the predetermined period of time after the presence of the user was detected, configuring the physical input mechanism to cause a second operation to be performed in response to detecting the input directed to the physical input mechanism, wherein the second operation is different from the first operation.

In some embodiments, a computer system that is in communication with a display component and a physical input mechanism is described. In some embodiments, the computer system that is in communication with a display component and a physical input mechanism comprises one or more processors and memory storing one or more programs configured to be executed by the one or more processors. In some embodiments, the one or more programs includes instructions for: detecting presence of a user; and in response to detecting the presence of the user: in accordance with a determination that the computer system will be moving within a predetermined period of time after the presence of the user was detected, configuring the physical input mechanism to cause a first operation to be performed in response to detecting input directed to the physical input mechanism; and in accordance with a determination that the computer system will not be moving within the predetermined period of time after the presence of the user was detected, configuring the physical input mechanism to cause a second operation to be performed in response to detecting the input directed to the physical input mechanism, wherein the second operation is different from the first operation.

In some embodiments, a computer system that is in communication with a display component and a physical input mechanism is described. In some embodiments, the computer system that is in communication with a display component and a physical input mechanism comprises means for performing each of the following steps: detecting presence of a user; and in response to detecting the presence of the user: in accordance with a determination that the computer system will be moving within a predetermined period of time after the presence of the user was detected, configuring the physical input mechanism to cause a first operation to be performed in response to detecting input directed to the physical input mechanism; and in accordance with a determination that the computer system will not be moving within the predetermined period of time after the presence of the user was detected, configuring the physical input mechanism to cause a second operation to be performed in response to detecting the input directed to the physical input mechanism, wherein the second operation is different from the first operation.

In some embodiments, a computer program product is described. In some embodiments, the computer program product comprises one or more programs configured to be executed by one or more processors of a computer system that is in communication with a display component and a physical input mechanism. In some embodiments, the one or more programs include instructions for: detecting presence of a user; and in response to detecting the presence of the user: in accordance with a determination that the computer system will be moving within a predetermined period of time after the presence of the user was detected, configuring the physical input mechanism to cause a first operation to be performed in response to detecting input directed to the physical input mechanism; and in accordance with a determination that the computer system will not be moving within the predetermined period of time after the presence of the user was detected, configuring the physical input mechanism to cause a second operation to be performed in response to detecting the input directed to the physical input mechanism, wherein the second operation is different from the first operation.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for performing operations based on device context, thereby increasing the effectiveness, efficiency, and user satisfaction with such devices. Such methods and interfaces may complement or replace other methods for performing operations based on device context.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

The following description sets forth exemplary techniques for performing operations based on device context. This description is not intended to limit the scope of this disclosure but is instead provided as a description of example implementations.

Users need electronic devices that provide effective techniques for performing operations based on device context. Efficient techniques can reduce a user's mental load when accessing operations based on device context. This reduction in mental load can enhance user productivity and make the device easier to use. In some embodiments, the techniques described herein can reduce battery usage and processing time (e.g., by providing user interfaces that require fewer user inputs to operate).

Figure 1:
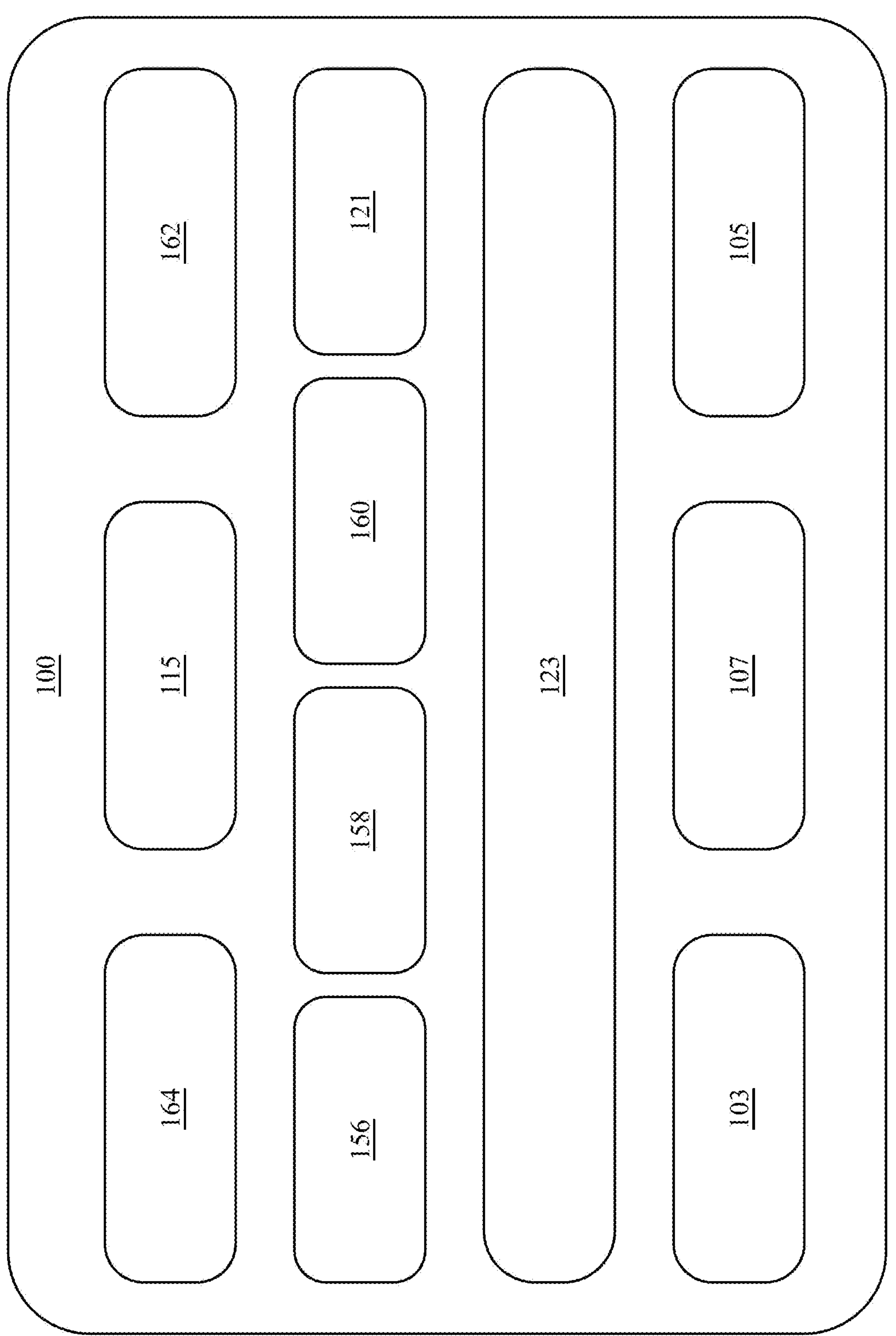
FIG. 1 is a block diagram illustrating a system with various components in accordance with some embodiments.
Figure 3:
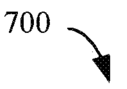
FIG. 3 is a flow diagram illustrating a method for displaying user interfaces in accordance with some embodiments.
Figure 4:
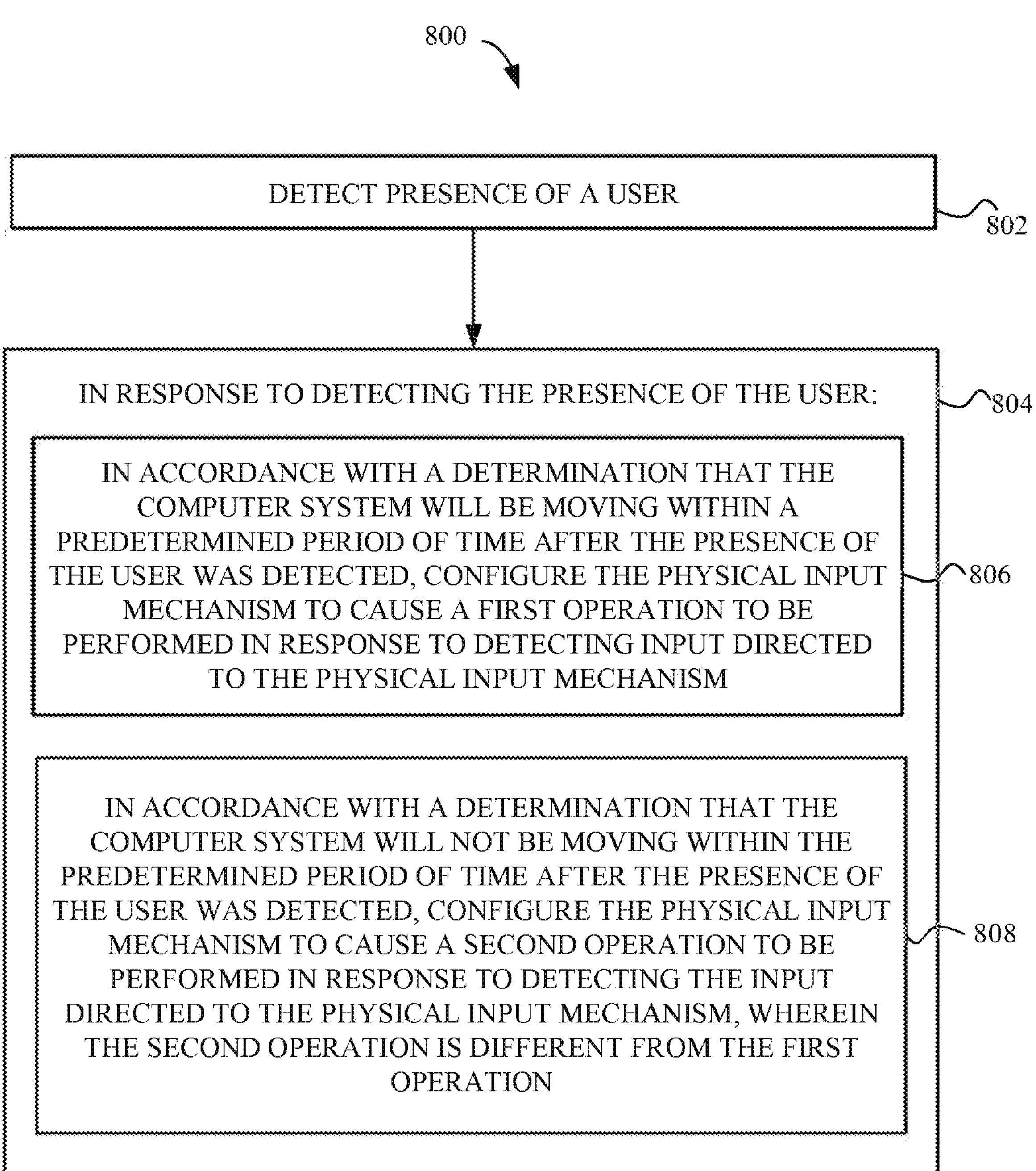
FIG. 4 is a flow diagram illustrating a method for configuring a device to perform a respective operation in accordance with some embodiments.

FIG. 1 provides illustrations of exemplary devices for performing techniques for performing operations based on device context. FIGS. 2A-2F illustrate exemplary user interfaces for controlling one or more operations in accordance with some embodiments. FIG. 3 is a flow diagram illustrating methods of displaying user interfaces in accordance with some embodiments. FIG. 4 is a flow diagram illustrating methods of configuring a device to perform a respective operation in accordance with some embodiments. The user interfaces in FIGS. 2A-2F are used to illustrate the processes described below, including the processes in FIGS. 3 and 4.

The processes below describe various techniques for making user interfaces and/or human-computer interactions more efficient (e.g., by helping the user to quickly and easily provide inputs and preventing user mistakes when operating a device). These techniques sometimes reduce the number of inputs needed for a user (e.g., a person and/or a user) to perform an operation, provide clear and/or meaningful feedback (e.g., visual, acoustic, and/or haptic feedback) to the user so that the user knows what has happened or what to expect, provide additional information and controls without cluttering the user interface, and/or perform certain operations without requiring further input from the user. Since the user can use a device more quickly and easily, these techniques sometimes improve battery life and/or reduce power usage of the device.

In methods described where one or more steps are contingent on one or more conditions having been satisfied, it should be understood that the described method can be repeated in multiple repetitions so that over the course of the repetitions all of the conditions upon which steps in the method are contingent have been satisfied in different repetitions of the method. For example, if a method requires performing a first step if a condition is satisfied, and a second step if the condition is not satisfied, it should be appreciated that the steps are repeated until the condition has been both satisfied and not satisfied, in no particular order. Thus, a method described with one or more steps that are contingent upon one or more conditions having been satisfied could be rewritten as a method that is repeated until each of the conditions described in the method has been satisfied. This multiple repetition, however, is not required of system or computer readable medium claims where the system or computer readable medium contains instructions for performing conditional operations that require that one or more conditions be satisfied before the operations occur. A person having ordinary skill in the art would also understand that, similar to a method with conditional steps, a system or computer readable storage medium can repeat the steps of a method as many times as are needed to ensure that all of the conditional steps have been performed.

The terminology used in the description of the various embodiments is for the purpose of describing particular embodiments only and is not intended to be limiting.

User interfaces for electronic devices, and associated processes for using these devices, are described below. In some embodiments, the device is a desktop computer with a touch-sensitive surface (e.g., a touch screen display and/or a touchpad). In other embodiments, the device is a portable, movable, and/or mobile electronic device (e.g., a processor, a smart phone, a smart watch, a tablet, a fitness tracking device, a laptop, a head-mounted display (HMD) device, a communal device, a vehicle, a media device, a smart speaker, a smart display, a robot, a television and/or a personal computing device).

In some embodiments, the electronic device is a computer system that is in communication with a display component (e.g., by wireless or wired communication). The display component may be integrated into the computer system or may be separate from the computer system. Additionally, the display component may be configured to provide visual output to a display (e.g., a liquid crystal display, an OLED display, or CRT display). As used herein, "displaying" content includes causing to display the content (e.g., video data rendered or decoded by a display controller) by transmitting, via a wired or wireless connection, data (e.g., image data or video data) to an integrated or external display component to visually produce the content. In some embodiments, visual output is any output that is capable of being perceived by the human eye, including, and not limited to images, videos, graphs, charts, and other graphical representations of data.

In some embodiments, the electronic device is a computer system that is in communication with an audio generation component (e.g., by wireless or wired communication). The audio generation component may be integrated into the computer system or may be separate from the computer system. Additionally, the audio generation component may be configured to provide audio output. Examples of an audio generation component include a speaker, a home theater system, a soundbar, a headphone, an earphone, an earbud, a television speaker, an augmented reality headset speaker, an audio jack, an optical audio output, a Bluetooth audio output, and/or an HDMI audio output). In some embodiments, audio output is any output that is capable of being perceived by the human ear, including, and not limited to sound waves, music, speech, and/or other audible representations of data.

In the discussion that follows, an electronic device that includes particular input and output devices is described. It should be understood, however, that the electronic device optionally includes one or more other input and/or output devices, such as physical user-interface devices (e.g., a physical keyboard, a mouse, and/or a joystick).

FIG. 1 illustrates an example system 100 for implementing techniques described herein. System 100 can perform any of the methods described in FIGS. 3 and/or 4 (e.g., process 700 and/or 800) and/or portions of these methods.

In FIG. 1, system 100 includes various components, such as processor(s) 103, RF circuitry(ies) 105, memory(ies) 107, sensors 156 (e.g., image sensor(s), orientation sensor(s), location sensor(s), heart rate monitor(s), temperature sensor(s)), input device(s) 158 (e.g., camera(s) (e.g., a periscope camera, a telephoto camera, a wide-angle camera, and/or an ultra-wide-angle camera), depth sensor(s), microphone(s), touch sensitive surface(s), hardware input mechanism(s), and/or rotatable input mechanism(s)), mobility components (e.g., actuator(s) (e.g., pneumatic actuator(s), hydraulic actuator(s), and/or electric actuator(s)), motor(s), wheel(s), movable base(s), rotatable component(s), translation component(s), and/or rotatable base(s)) and output device(s) 160 (e.g., speaker(s), display component(s), audio generation component(s), haptic output device(s), display screen(s), projector(s), and/or touch-sensitive display(s)). These components optionally communicate over communication bus(es) 123 of the system. Although shown as separate components, in some implementations, various components can be combined and function as a single component, such as a sensor can be an input device.

In some embodiments, system 100 is a mobile and/or movable device (e.g., a tablet, a smart phone, a laptop, head-mounted display (HMD) device, and or a smartwatch). In other embodiments, system 100 is a desktop computer, an embedded computer, and/or a server.

In some embodiments, processor(s) 103 includes one or more general processors, one or more graphics processors, and/or one or more digital signal processors. In some embodiments, memory(ies) 107 is one or more non-transitory computer-readable storage mediums (e.g., flash memory and/or random-access memory) that store computer-readable instructions configured to be executed by processor(s) 103 to perform techniques described herein.

In some embodiments, RF circuitry(ies) 105 includes circuitry for communicating with electronic devices and/or networks (e.g., the Internet, intranets, and/or a wireless network, such as cellular networks and wireless local area networks (LANs)). In some embodiments, RF circuitry(ies) 105 includes circuitry for communicating using near-field communication and/or short-range communication, such as Bluetooth® or Ultra-wideband.

In some embodiments, display(s) 121 includes one or more monitors, projectors, and/or screens. In some embodiments, display(s) 121 includes a first display for displaying images to a first eye of a user and a second display for displaying images to a second eye of the user. In such embodiments, corresponding images can be simultaneously displayed on the first display and the second display. Optionally, the corresponding images include the same virtual objects and/or representations of the same physical objects from different viewpoints, resulting in a parallax effect that provides the user with the illusion of depth of the objects on the displays. In some embodiments, display(s) 121 is a single display. In such embodiments, corresponding images are simultaneously displayed in a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 115 for receiving user inputs, such as tap inputs and swipe inputs. In some embodiments, display(s) 121 and touch-sensitive surface(s) 115 form touch-sensitive display(s).

In some embodiments, sensor(s) 156 includes sensors for detecting various conditions. In some embodiments, sensor(s) 156 includes orientation sensors (e.g., orientation sensor(s) 111) for detecting orientation and/or movement of platform 150. For example, system 100 uses orientation sensors to track changes in the location and/or orientation (sometimes collectively referred to as position) of system 100, such as with respect to physical objects in the physical environment. In some embodiments, sensor(s) 156 includes one or more gyroscopes, one or more inertial measurement units, and/or one or more accelerometers. In some embodiments, sensor(s) 156 includes a global positioning sensor (GPS) for detecting a GPS location of platform 150. In some embodiments, sensor(s) 156 includes a radar system, LIDAR system, sonar system, image sensors (e.g., image sensor(s) 109, visible light image sensor(s), and/or infrared sensor(s)), depth sensor(s), rangefinder(s), and/or motion detector(s). In some embodiments, sensor(s) 156 includes sensors that are in an interior portion of system 100 and/or sensors that are on an exterior of system 100. In some embodiments, system 100 uses sensor(s) 156 (e.g., interior sensors) to detect a presence and/or state (e.g., location and/or orientation) of a passenger in the interior portion of system 100. In some embodiments, system 100 uses sensor(s) 156 (e.g., external sensors) to detect a presence and/or state of an object external to system 100. In some embodiments, system 100 uses sensor(s) 156 to receive user inputs, such as hand gestures and/or other air gesture. In some embodiments, system 100 uses sensor(s) 156 to detect the location and/or orientation of system 100 in the physical environment. In some embodiments, system 100 uses sensor(s) 156 to navigate system 100 along a planned route, around obstacles, and/or to a destination location. In some embodiments, sensor(s) 156 include one or more sensors for identifying and/or authenticating a user of system 100, such as a fingerprint sensor and/or facial recognition sensor.

In some embodiments, image sensor(s) includes one or more visible light image sensor, such as charged coupled device (CCD) sensors, and/or complementary metal-oxide-semiconductor (CMOS) sensors operable to obtain images of physical objects. In some embodiments, image sensor(s) includes one or more infrared (IR) sensor(s), such as a passive IR sensor or an active IR sensor, for detecting infrared light. For example, an active IR sensor can include an IR emitter, such as an IR dot emitter, for emitting infrared light. In some embodiments, image sensor(s) includes one or more camera(s) configured to capture movement of physical objects. In some embodiments, image sensor(s) includes one or more depth sensor(s) configured to detect the distance of physical objects from system 100. In some embodiments, system 100 uses CCD sensors, cameras, and depth sensors in combination to detect the physical environment around system 100. In some embodiments, image sensor(s) includes a first image sensor and a second image sensor different form the first image sensor. In some embodiments, system 100 uses image sensor(s) to receive user inputs, such as hand gestures and/or other air gestures. In some embodiments, system 100 uses image sensor(s) to detect the location and/or orientation of system 100 in the physical environment.

In some embodiments, system 100 uses orientation sensor(s) for detecting orientation and/or movement of system 100. For example, system 100 can use orientation sensor(s) to track changes in the location and/or orientation of system 100, such as with respect to physical objects in the physical environment. In some embodiments, orientation sensor(s) includes one or more gyroscopes, one or more inertial measurement units, and/or one or more accelerometers.

In some embodiments, system 100 uses microphone(s) to detect sound from one or more users and/or the physical environment of the one or more users. In some embodiments, microphone(s) includes an array of microphones (including a plurality of microphones) that optionally operate in tandem, such as to identify ambient noise or to locate the source of sound in space (e.g., inside system 100 and/or outside of system 100) of the physical environment.

In some embodiments, input device(s) 158 includes one or more mechanical and/or electrical devices for detecting input, such as button(s), slider(s), knob(s), switch(es), remote control(s), joystick(s), touch-sensitive surface(s), keypad(s), microphone(s), and/or camera(s). In some embodiments, input device(s) 158 include one or more input devices inside system 100. In some embodiments, input device(s) 158 include one or more input devices (e.g., a touch-sensitive surface and/or keypad) on an exterior of system 100.

In some embodiments, output device(s) 160 include one or more devices, such as display(s), monitor(s), projector(s), speaker(s), light(s), and/or haptic output device(s). In some embodiments, output device(s) 160 includes one or more external output devices, such as external display screen(s), external light(s), and/or external speaker(s). In some embodiments, output device(s) 160 includes one or more internal output devices, such as internal display screen(s), internal light(s), and/or internal speaker(s).

In some embodiments, environment controls 162 includes mechanical and/or electrical systems for monitoring and/or controlling conditions of an internal portion (e.g., cabin) of system 100. In some embodiments, environmental controls 162 includes fan(s), heater(s), air conditioner(s), and/or thermostat(s) for controlling the temperature and/or airflow within the interior portion of system 100.

In some embodiments, mobility component(s) includes mechanical and/or electrical components that enable a platform to move and/or assist in the movement of the platform. In some embodiments, mobility system 164 includes powertrain(s), drivetrain(s), motor(s) (e.g., an electrical motor), engine(s), power source(s) (e.g., battery(ies)), transmission(s), suspension system(s), speed control system(s), and/or steering system(s). In some embodiments, one or more elements of mobility component(s) are configured to be controlled autonomously or manually (e.g., via system 100 and/or input device(s) 158).

In some embodiments, system 100 performs monetary transactions with or without another computer system. For example, system 100, or another computer system associated with and/or in communication with system 100 (e.g., via a user account described below), is associated with a payment account of a user, such as a credit card account or a checking account. To complete a transaction, system 100 can transmit a key to an entity from which goods and/or services are being purchased that enables the entity to charge the payment account for the transaction. As another example, system 100 stores encrypted payment account information and transmits this information to entities from which goods and/or services are being purchased to complete transactions.

System 100 optionally conducts other transactions with other systems, computers, and/or devices. For example, system 100 conducts transactions to unlock another system, computer, and/or device and/or to be unlocked by another system, computer, and/or device. Unlocking transactions optionally include sending and/or receiving one or more secure cryptographic keys using, for example, RF circuitry(ies) 105.

In some embodiments, system 100 is capable of communicating with other computer systems and/or electronic devices. For example, system 100 can use RF circuitry(ies) 105 to access a network connection that enables transmission of data between systems for the purpose of communication. Example communication sessions include phone calls, e-mails, SMS messages, and/or videoconferencing communication sessions.

In some embodiments, videoconferencing communication sessions include transmission and/or receipt of video and/or audio data between systems participating in the videoconferencing communication sessions, including system 100. In some embodiments, system 100 captures video and/or audio content using sensor(s) 156 to be transmitted to the other system(s) in the videoconferencing communication sessions using RF circuitry(ies) 105. In some embodiments, system 100 receives, using the RF circuitry(ies) 105, video and/or audio from the other system(s) in the videoconferencing communication sessions, and presents the video and/or audio using output device(s) 160, such as display(s) 121 and/or speaker(s). In some embodiments, the transmission of audio and/or video between systems is near real-time, such as being presented to the other system(s) with a delay of less than 0.1, 0.5, 1, or 3 seconds from the time of capturing a respective portion of the audio and/or video.

In some embodiments, the system 100 generates tactile (e.g., haptic) outputs using output device(s) 160. In some embodiments, output device(s) 160 generates the tactile outputs by displacing a moveable mass relative to a neutral position. In some embodiments, tactile outputs are periodic in nature, optionally including frequency(ies) and/or amplitude(s) of movement in two or three dimensions. In some embodiments, system 100 generates a variety of different tactile outputs differing in frequency(ies), amplitude(s), and/or duration/number of cycle(s) of movement included. In some embodiments, tactile output pattern(s) includes a start buffer and/or an end buffer during which the movable mass gradually speeds up and/or slows down at the start and/or at the end of the tactile output, respectively.

In some embodiments, tactile outputs have a corresponding characteristic frequency that affects a "pitch" of a haptic sensation that a user feels. For example, higher frequency(ies) corresponds to faster movement(s) by the moveable mass whereas lower frequency(ies) corresponds to slower movement(s) by the moveable mass. In some embodiments, tactile outputs have a corresponding characteristic amplitude that affects a "strength" of the haptic sensation that the user feels. For example, higher amplitude(s) corresponds to movement over a greater distance by the moveable mass, whereas lower amplitude(s) corresponds to movement over a smaller distance by the moveable mass. In some embodiments, the "pitch" and/or "strength" of a tactile output varies over time.

In some embodiments, tactile outputs are distinct from movement of system 100. For example, system 100 can includes tactile output device(s) that move a moveable mass to generate tactile output and can include other moving part(s), such as motor(s), wheel(s), axel(s), control arm(s), and/or brakes that control movement of system 100. Although movement and/or cessation of movement of system 100 generates vibrations and/or other physical sensations in some situations, these vibrations and/or other physical sensations are distinct from tactile outputs. In some embodiments, system 100 generates tactile output independent from movement of system 100 For example, system 100 can generate a tactile output without accelerating, decelerating, and/or moving system 100 to a new position.

In some embodiments, system 100 detects gesture input(s) made by a user. In some embodiments, gesture input(s) includes touch gesture(s) and/or air gesture(s), as described herein. In some embodiments, touch-sensitive surface(s) 115 identify touch gestures based on contact patterns (e.g., different intensities, timings, and/or motions of objects touching or nearly touching touch-sensitive surface(s) 115). Thus, touch-sensitive surface(s) 115 detect a gesture by detecting a respective contact pattern. For example, detecting a finger-down event followed by detecting a finger-up (e.g., liftoff) event at (e.g., substantially) the same position as the finger-down event (e.g., at the position of a user interface element) can correspond to detecting a tap gesture on the user interface element. As another example, detecting a finger-down event followed by detecting movement of a contact, and subsequently followed by detecting a finger-up (e.g., liftoff) event can correspond to detecting a swipe gesture. Additional and/or alternative touch gestures are possible.

In some embodiments, an air gesture is a gesture that a user performs without touching input device(s) 158. In some embodiments, air gestures are based on detected motion of a portion (e.g., a hand, a finger, and/or a body) of a user through the air. In some embodiments, air gestures include motion of the portion of the user relative to a reference. Example references include a distance of a hand of a user relative to a physical object, such as the ground, an angle of an arm of the user relative to the physical object, and/or movement of a first portion (e.g., hand or finger) of the user relative to a second portion (e.g., shoulder, another hand, or another finger) of the user. In some embodiments, detecting an air gesture includes detecting absolute motion of the portion of the user, such as a tap gesture that includes movement of a hand in a predetermined pose by a predetermined amount and/or speed, or a shake gesture that includes a predetermined speed or amount of rotation of a portion of the user.

In some embodiments, detecting one or more inputs includes detecting speech of a user. In some embodiments, system 100 uses one or more microphones of input device(s) 158 to detect the user speaking one or more words. In some embodiments, system 100 parses and/or communicates information to one or more other systems to determine contents of the speech of the user, including identifying words and/or obtaining a semantic understanding of the words. For example, system processor(s) 103 can be configured to perform natural language processing to detect one or more words and/or determine a likely meaning of the one or more words in the sequence spoken by the user. Additionally or alternatively, in some embodiments, the system 100 determines the meaning of the one or more words in the sequence spoken based upon a context of the user determined by the system 100.

In some embodiments, system 100 outputs spatial audio via output device(s) 160. In some embodiments, spatial audio is output in a particular position. For example, system 100 can play a notification chime having one or more characteristics that cause the notification chime to be generated as if emanating from a first position relative to a current viewpoint of a user (e.g., "spatializing" and/or "spatialization" including audio being modified in amplitude, filtered, and/or delayed to provide a perceived spatial quality to the user).

In some embodiments, system 100 presents visual and/or audio feedback indicating a position of a user relative to a current viewpoint of another user, thereby informing the other user about an updated position of the user. In some embodiments, playing audio corresponding to a user includes changing one or more characteristics of audio obtained from another computer system to mimic an effect of placing an audio source that generates the play back of audio within a position corresponding to the user, such as a position within a three-dimensional environment that the user moves to, spawns at, and/or is assigned to. In some embodiments, a relative magnitude of audio at one or more frequencies and/or groups of frequencies is changed, one or more filters are applied to audio (e.g., directional audio filters), and/or the magnitude of audio provided via one or more channels are changed (e.g., increased or decreased) to create the perceived effect of the physical audio source. In some embodiments, the simulated position of the simulated audio source relative to a floor of the three-dimensional environment matches an elevation of a head of a participant providing audio that is generated by the simulated audio source, or is a predetermined one or more elevations relative to the floor of the three-dimensional environment. In some embodiments, in accordance with a determination that the position of the user will correspond to a second position, different from the first position, and that one or more first criteria are satisfied, system 100 presents feedback including generating audio as if emanating from the second position.

In some embodiments, system 100 communicates with one or more accessory devices. In some embodiments, one or more accessory devices is integrated with system 100. In some embodiments, one or more accessory devices is external to system 100. In some embodiments, system 100 communicates with accessory device(s) using RF circuitry(ies) 105 and/or using a wired connection. In some embodiments, system 100 controls operation of accessory device(s), such as door(s), window(s), lock(s), speaker(s), light(s), and/or camera(s). For example, system 100 can control operation of a motorized door of system 100. As another example, system 100 can control operation of a motorized window included in system 100. In some embodiments, accessory device(s), such as remote control(s) and/or other computer systems (e.g., smartphones, media players, tablets, computers, and/or wearable devices) functioning as input devices control operations of system 100. For example, a wearable device (e.g., a smart watch) functions as a key to initiate operation of an actuation system of system 100. In some embodiments, system 100 acts as an input device to control operations of another system, device, and/or computer, such as the system 100 functioning as a key to initiate operation of an actuation system of a platform associated with another system, device, and/or computer.

In some embodiments, digital assistant(s) help a user perform various functions using system 100. For example, a digital assistant can provide weather updates, set alarms, and perform searches locally and/or using a network connection (e.g., the Internet) via a natural-language interface. In some embodiments, a digital assistant accepts requests at least partially in the form of natural language commands, narratives, requests, statements, and/or inquiries. In some embodiments, a user requests an informational answer and/or performance of a task using the digital assistant. For example, in response to receiving the question "What is the current temperature?," the digital assistant answers "It is 30 degrees." As another example, in response to receiving a request to perform a task, such as "Please invite my family to dinner tomorrow," the digital assistant can acknowledge the request by playing spoken words, such as "Yes, right away," and then send the requested calendar invitation on behalf of the user to each family member of the user listed in a contacts list for the user. In some embodiments, during performance of a task requested by the user, the digital assistant engages with the user in a sustained conversation involving multiple exchanges of information over a period of time. Other ways of interacting with a digital assistant are possible to request performance of a task and/or request information. For example, the digital assistant can respond to the user in other forms, e.g., displayed alerts, text, videos, animations, music, etc. In some embodiments, the digital assistant includes a client-side portion executed on system 100 and a server-side portion executed on a server in communication with system 100. The client-side portion can communicate with the server through a network connection using RF circuitry(ies) 105. The client-side portion can provide client-side functionalities, input and/or output processing and/or communication with the server, for example. In some embodiments, the server-side portion provides server-side functionalities for any number client-side portions of multiple systems.

In some embodiments, system 100 is associated with one or more user accounts. In some embodiments, system 100 saves and/or encrypts user data, including files, settings, and/or preferences in association with particular user accounts. In some embodiments, user accounts are password-protected and system 100 requires user authentication before accessing user data associated with an account. In some embodiments, user accounts are associated with other system(s), device(s), and/or server(s). In some embodiments, associating one user account with multiple systems enables those systems to access, update, and/or synchronize user data associated with the user account. For example, the systems associated with a user account can have access to purchased media content, a contacts list, communication sessions, payment information, saved passwords, and other user data. Thus, in some embodiments, user accounts provide a secure mechanism for a customized user experience.

Attention is now directed towards examples of user interfaces ("UI") and associated processes that are implemented on a computer system, such as system 100.

FIGS. 2A-2F illustrate exemplary user interfaces for controlling one or more operations. The user interfaces in these figures are used to illustrate the processes described below, including the processes described below in relation to FIGS. 3 and 4.

Figures 2A, 2B:
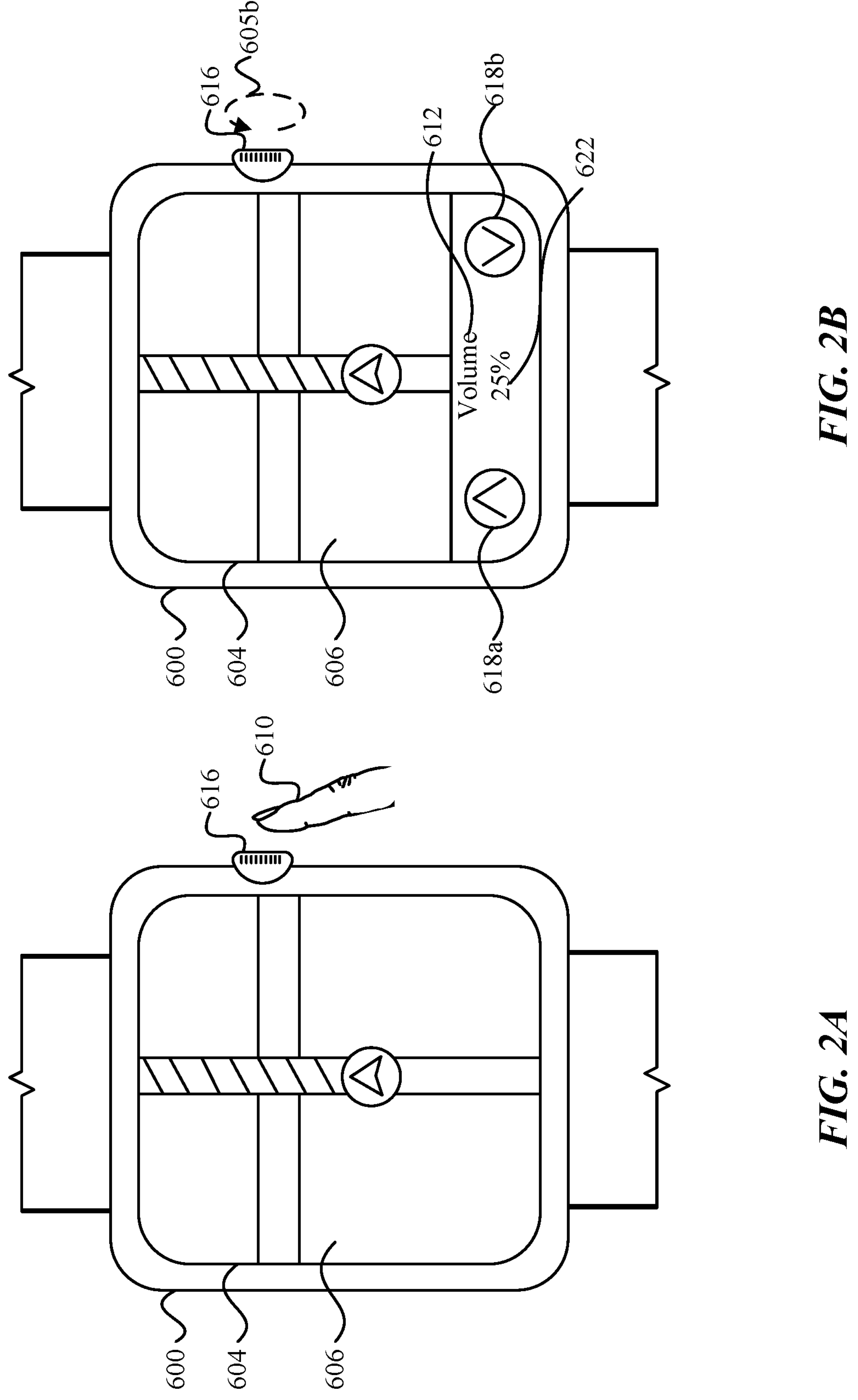
FIGS. 2A-2F illustrate exemplary user interfaces for controlling one or more operations in accordance with some embodiments.

FIG. 2A illustrates computer system 600 (e.g., a smartwatch) that includes display 604 (e.g., a display component) and rotatable input mechanism 616. It should be understood that the types of computer systems, user interfaces, user interface objects, and/or components described herein are merely exemplary and are provided to give context to the embodiments described herein. Computer system 600 is coupled to an external structure (e.g., a boat, an airplane, a car, a smart house, a smart car, smart boat, and/or a trailer) that includes, for example, one or more lights, windows, and/or doors. Computer system 600 is in communication (e.g., wired and/or wireless communication (e.g., Wi-Fi, Bluetooth, and/or Ultra-Wideband)) with the one or more doors of the external structure. In some embodiments, computer system 600 is the external structure. In other examples, the external structure is another computer system separate from computer system 600 (e.g., the other computer system is different from computer system 600). In some embodiments, computer system 600 includes one or more components of system 100.

At FIG. 2A, the external structure is moving and enroute to a destination. In some embodiments, the external structure may not yet be in motion, but will be in motion within a predetermined amount of time (e.g., 0.1-30 seconds) and/or will be in motion for at least a predetermined amount of time (e.g., at least 0.1-30 seconds). In some embodiments, computer system 600 includes a knob, a dial, a joystick, a touch-sensitive surface, a button, a slider. In some embodiments, computer system 600 is a television, a projector, a monitor, a smart display, a laptop, a wearable device, and/or a personal computer. In some embodiments, display 604 is positioned within rotatable input mechanism 616. In some embodiments, display 604 is positioned above or below rotatable input mechanism 616. In some embodiments, display 604 is positioned around rotatable input mechanism 616. In some embodiments, rotatable input mechanism 616 is positioned on the surface of display 604. In some embodiments, display 604 is positioned on the surface of rotatable input mechanism 616.

As illustrated in FIG. 2A, computer system 600 displays navigation user interface 606. Navigation user interface 606 includes real-time navigation instructions to the destination. At FIG. 2A, while the external structure is moving, computer system 600 detects the presence of user 610. In some embodiments, detecting the presence of user 610 includes detecting that user 610 is in a certain position (e.g., user 610 is sitting, user 610 is standing, or user 610 is lying down) within the external structure and/or near a particular location within the external structure. In some embodiments, computer system 600 detects the presence of user 610 via one or more cameras or sensors that are in communication with computer system 600. In some embodiments, computer system 600 detects the presence of user 610 via a wireless signal that computer system 600 receives from an external computer system (e.g., a smart watch and/or a fitness tracking device) being worn by user 610 (e.g., user 610 is wearing the external computer system, user 610 is holding the external computer system, and/or user 610 is touching the external computer system) and/or an external computer system that belongs to and/or is registered to user 610. In some embodiments, as a part of detecting the presence of user 610, computer system 600 detects that a hand of user 610 is within a predetermined distance (e.g., 0.1-1 meters) of display 604. In some embodiments, as a part of detecting the presence of user 610, computer system 600 detects that a hand of user 610 is within a predetermined distance (e.g., 0.1-1 meters) of rotatable input mechanism 616. In some embodiments, as a part of detecting the presence of user 610, computer system 600 detects that user 610 touches an area of the external structure and/or computer system 600.

As illustrated in FIG. 2B, in response to detecting the presence of user 610 while the external structure is moving, computer system 600 displays accessory control user interface 612 by changing the display of the navigation user interface 606, such as by shrinking and/or moving navigation user interface 606 upward. As illustrated in FIG. 2B, computer system 600 concurrently displays accessory control user interface 612 and navigation user interface 606. For example, FIG. 2B illustrates accessory control user interface 612 occupying a bottom portion of display 604 that was previously occupied by navigation user interface 606. Accessory control user interface 612 includes one or more control user interface objects that correspond to one or more accessories (e.g., lights, air conditioning system, heating system, seat heating system, playback device, doors, and/or windows) of the external structure. As illustrated in FIG. 2B, accessory control user interface 612 includes volume increase user interface object 618*a* and volume decrease user interface object 618*b*. In some embodiments, computer system 600 displays accessory control user interface 612 only if the presence of user 610 is detected.

Volume increase user interface object 618*a* and volume decrease user interface object 618*b* correspond to a playback device that is integrated into and/or that is in communication with the external structure. In some embodiments, computer system 600 ceases to display accessory control user interface 612 when a determination is made that the external structure transitions from a moving state to a non-moving state. In some embodiments, computer system 600 continues to display accessory control user interface 612 when a determination is made that the external structure transitions from a moving state to a non-moving state. In some embodiments, accessory control user interface 612 is not displayed on an external display (e.g., a display external to computer system 600) while computer system 600 displays accessory control user interface 612 on display 604. In some embodiments, computer system 600 continues to detect the presence of user 610 while computer system 600 displays accessory control user interface 612. In some embodiments, computer system 600 ceases to display accessory control user interface 612 in response to computer system 600 ceasing to detect the presence of user 610.

As illustrated in FIG. 2B, accessory control user interface 612 includes volume indicator user interface object 622. Volume indicator user interface object 622 indicates the current volume setting of the playback device. Accordingly, at FIG. 2B, the playback device is set to a volume level of 25% of a maximum volume setting. In some embodiments, accessory control user interface 612 includes one or more control user interface objects that change a sensory characteristic (e.g., a characteristic that is detectable by one or more senses of an individual) (e.g., sight, taste, smell, touch, and/or sound) of the external structure (e.g., the brightness of one or more lights in the external structure, volume of one or more playback devices in the external structure, temperature setting of one or more air conditioning and/or heating devices in the external structure, and/or smell within the external structure). In some embodiments, computer system 600 does not display a respective user interface prior to displaying accessory control user interface 612.

At FIG. 2B, in response to detecting the presence of user 610 while the external structure is moving, computer system 600 configures rotatable input mechanism 616 to control the playback device. At FIG. 2B, computer system 600 detects input 605*b* that corresponds to rotation of rotatable input mechanism 616 of the external structure. In some embodiments, in response to detecting that the external structure transitions from a moving state to a non-moving state, computer system 600 de-configures rotatable input mechanism 616 from controlling the playback device, and computer system 600 configures rotatable input mechanism 616 to control one or more accessories of the external structure. In some embodiments, while rotatable input mechanism 616 is configured to control the playback device, computer system 600 transmits one or more instructions to the playback device that cause the playback device to initiate or pause the playback of a media item in response to detecting a tap input (or, In some embodiments, a long-press input, and/or rotation input) on rotatable input mechanism 616. In some embodiments, while rotatable input mechanism 616 is configured to control the playback device, computer system 600 does not perform a respective operation in response to detecting a tap input on rotatable input mechanism 616. In some embodiments, while rotatable input mechanism 616 is configured to control the playback device, computer system 600 does not perform a respective operation in response to detecting that rotatable input mechanism 616 is depressed. In some embodiments, input 605*b* a corresponds to one or more other types of inputs, such as a rotational input, a swipe input, a tap input, an air gesture, a voice input, and/or a gaze input. In some embodiments, other inputs described below in relation to FIGS. 2B-2F can alternatively be one or more other types of inputs, such as a rotational input, a swipe input, a tap input, an air gesture, a voice input, and/or a gaze input.

Figures 2C, 2D:
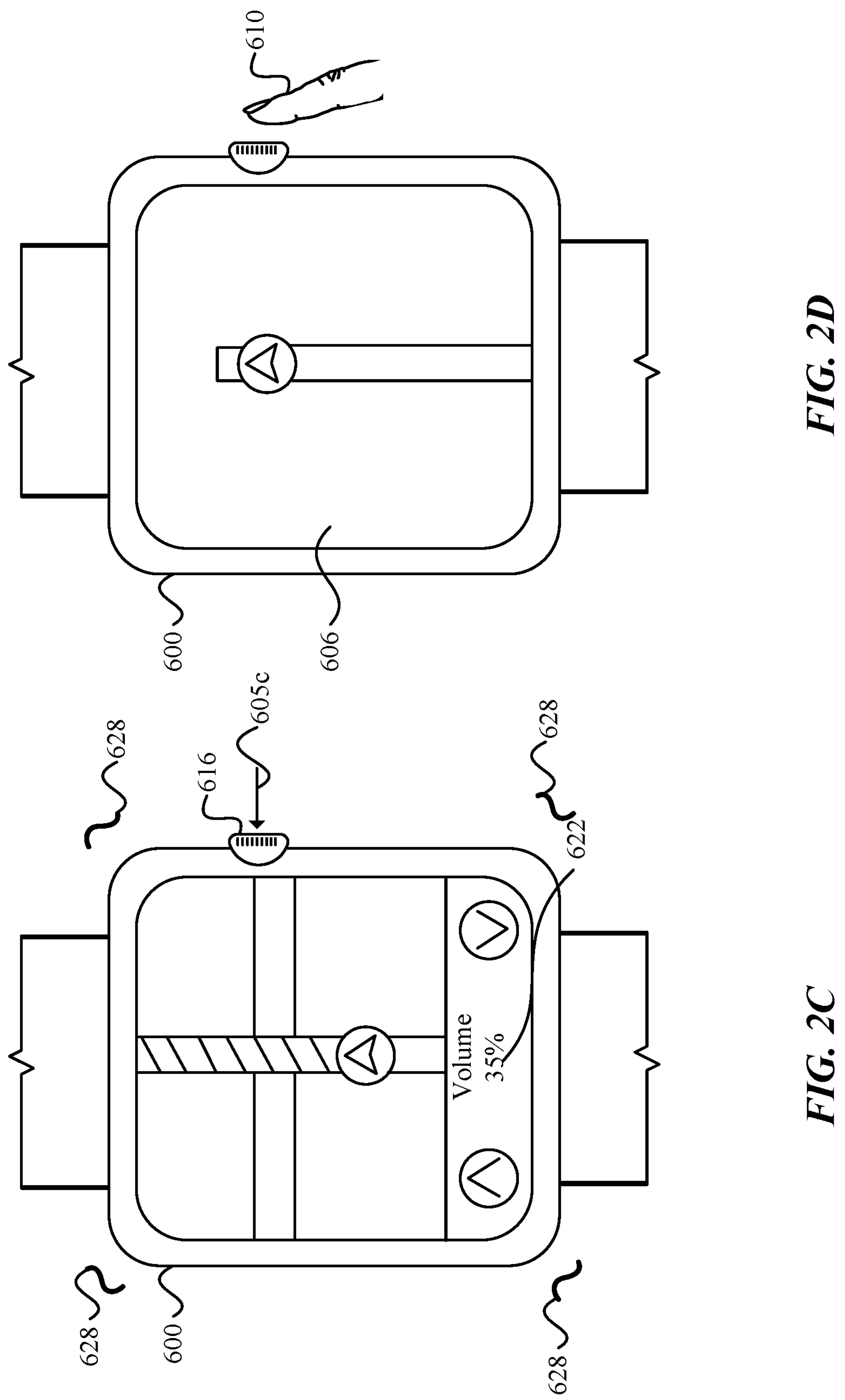

At FIG. 2C, in response to detecting input 605*b*, computer system 600 transmits one or more instructions to the playback device that cause the volume of the playback device to increase from 25% of the maximum volume level to 35% of the maximum volume level. Accordingly, at FIG. 2C, computer system 600 updates the display of volume indicator user interface object 622, such that volume indicator user interface object 622 indicates that the current volume level of the playback device is set to 35% of the maximum volume level. In some embodiments, when a determination is made that rotatable input mechanism 616 is rotated in a clockwise direction, computer system 600 causes the volume of the playback device to increase. In some embodiments, when a determination is made that rotatable input mechanism 616 is rotated in a counterclockwise direction, computer system 600 causes the volume of the playback device to decrease. In some embodiments, in response to detecting an input that corresponds to selection of volume increase user interface object 618*a*, computer system 600 transmits one or more instructions to the playback device that cause the volume of the playback device to increase. In some embodiments, in response to detecting an input that corresponds to selection of volume decrease user interface object 618*b*, computer system 600 transmits one or more instructions to the playback device that cause the volume of the playback device to decrease. In some embodiments, after the volume level of the playback device is modified, in response to detecting input 605*c* that corresponds to a pressing of rotatable input mechanism 616, computer system 600 transmits one or more instructions to the playback device that cause the playback device to pause or initiate the playback of a media item.

Further, at FIG. 2C, along with transmitting one or more instructions to the playback device, computer system 600 outputs first haptic alert 628. In some embodiments, computer system 600 outputs first haptic alert 628 as series of discrete haptic alerts. In some embodiments, computer system 600 outputs first haptic alert 628 as a continuous haptic alert.

At FIG. 2D, the external structure arrives at the destination. Accordingly, at FIG. 2D, the external structure is not moving (e.g., the external structure will not be in a motion within a predetermined amount of time (e.g., 0.1-30 seconds)). As illustrated in FIG. 2D, while the external structure is not moving, computer system 600 displays and/or continues to display navigation user interface 606. At FIG. 2D, while computer system 600 is not moving, computer system 600 detects the presence of user 610.

Figures 2E, 2F:
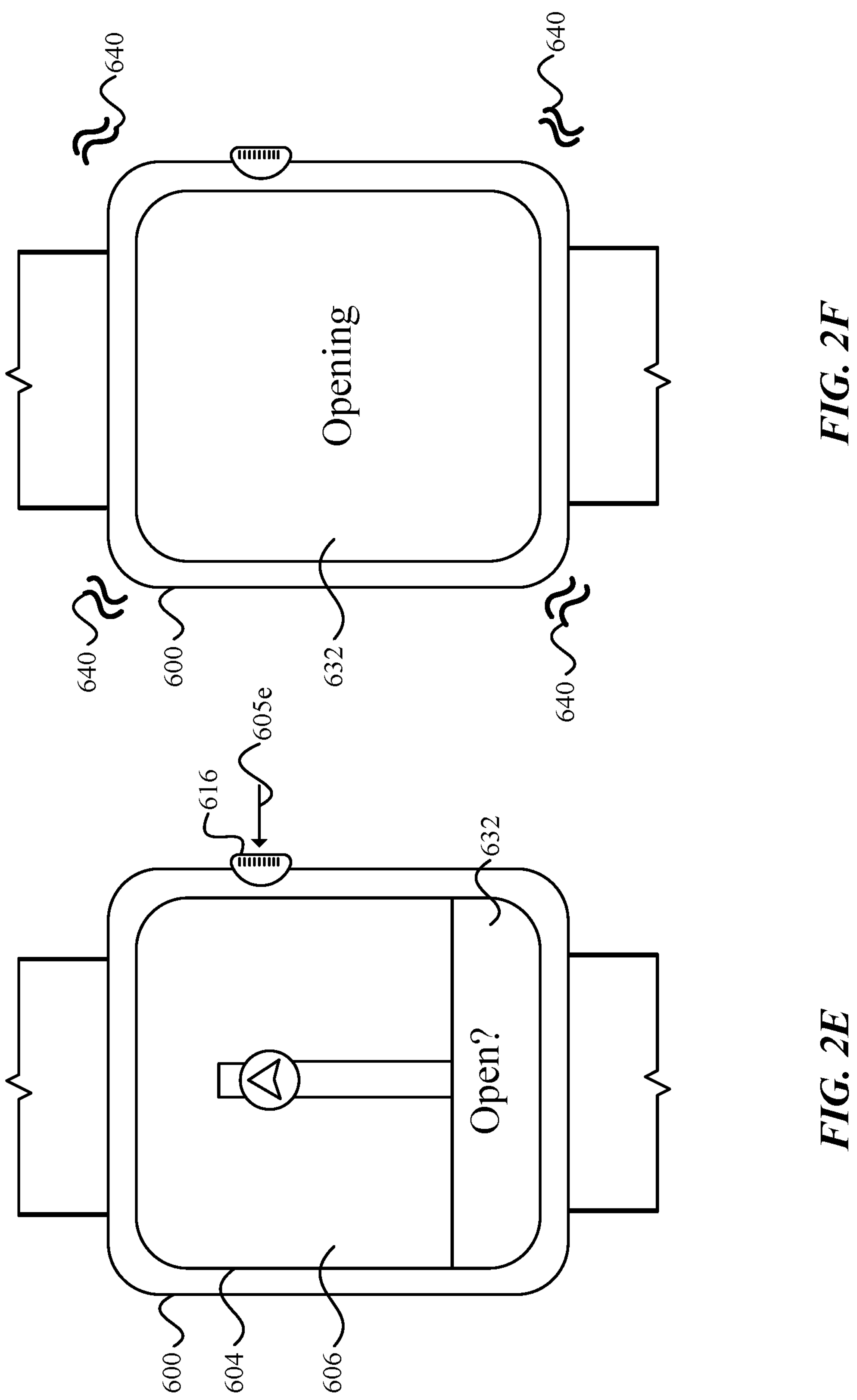

At FIG. 2E, in response to computer system 600 detecting the presence of user 610 while the external structure is not moving (e.g., the external structure will not be moving within a predetermined amount of time (e.g., 0.1-30 seconds)), computer system 600 displays door control user interface 632. Door control user interface 632 corresponds to the one or more doors of the external structure. At FIG. 2E, the one or more doors of the external structure are closed. Accordingly, as illustrated in FIG. 2E, computer system 600 displays an indication that doors can be opened. For example, FIG. 2E illustrates computer system 600 displaying "Open?" within door control user interface 632. As illustrated in FIG. 2E, computer system 600 concurrently displays navigation user interface 606 and door control user interface 632. However, as part of displaying door control user interface 632, computer system 600 may change the display of the navigation user interface 606 in order to show both the door control user interface 632 and navigation user interface 606. For example, computer system 600 may reduce the size of the display of navigation user interface 606. In some embodiments, door control user interface 632 includes a selectable control user interface object. In embodiments where door control user interface 632 includes the selectable control user interface object, in response to computer system 600 detecting an input that corresponds to selection of the selectable control user interface object, computer system 600 transmits one or more instructions to the one or more doors of the external structure that cause the one or more doors to open or close. In some embodiments, door control user interface 632 is not displayed on an external display (e.g., a display external to computer system 600) while computer system 600 displays door control user interface 632 on display 604.

At FIG. 2E, in response to computer system 600 detecting the presence of user 610 while computer system 600 is not moving, computer system 600 configures rotatable input mechanism 616 to control the one or more doors of the external structure. At FIG. 2E, computer system 600 detects input 605*e* that corresponds to a pressing of rotatable input mechanism 616. In some embodiments, in response to detecting that the external structure transitions from a non-moving state to a moving state, computer system 600 unconfigures rotatable input mechanism 616 from controlling the one or more doors of the external structure and computer system 600 configures rotatable input mechanism 616 to perform another operation, such as control the playback device of the external structure. In some embodiments, while rotatable input mechanism 616 is configured to control the one or more doors of the external structure, computer system 600 does not perform a respective operation in response to detecting that rotatable input mechanism 616 is rotated. In some embodiments, accessory control user interface 612 includes a different number of one or more user interface objects that, when selected, cause the external structure to perform one or more respective operations than the number of user interface objects included with door control user interface 632. In some embodiments, computer system 600 does not display a user interface prior to displaying door control user interface 632. For example, a display component in communication with computer system 600 is off and/or inactive, causing nothing to be displayed by the display component. In some embodiments, when a determination is made that the external structure transitions from a non-moving state to a moving state, computer system 600 ceases to display door control user interface 632 and displays accessory control user interface 612.

At FIG. 2F, in response to detecting input 605*e*, computer system 600 transmits one or more instructions to the one or more doors of the external structure that cause the one or more doors to open. At FIG. 2F, as part of transmitting one or more instructions to the one or more doors of the external structure, computer system 600 outputs second haptic alert 640. In some embodiments, second haptic alert 640 is different from first haptic alert 628 (e.g., the intensity and/or length of second haptic alert 640 is different from first haptic alert 628). For example, computer system 600 can output first haptic alert 628 as a series of discrete haptic output (e.g., discrete vibrations that are separated in time such that no vibration is performed between the discrete vibrations), and computer system 600 can output second haptic alert 640 as a continuous haptic alert (e.g., vibrations are performed for a similar or same amount of time as the series of discrete haptic output except that there is no time that no vibration is performed) or vice versa. In some embodiments, input 605*e* corresponds to a rotation of rotatable input mechanism 616, gaze, voice command, tap input, slide input, and/or a long tap (e.g., a tap and hold). In some embodiments, computer system 600 causes a door of the external structure to open or close. In some embodiments, computer system 600 causes a door of the external structure that is positioned closest to computer system 600 to open or close. In some embodiments, computer system 600 causes a door of the external structure that is positioned closest to the user to open or close. In some embodiments, computer system 600 cause an actuator of the external device to actuate the one or more doors by transmitting one or more instructions to the one or more doors of the external structure. In some embodiments, in response to detecting input 605*e*, computer system 600 transmits one or more instructions to one or more windows of the external structure that cause the one or more windows of the external structure to open or close.

As illustrated in FIG. 2F, in response to detecting input 605*e*, computer system 600 ceases to display navigation user interface 606, and computer system 600 expands the display of door control user interface 632. Accordingly, as illustrated in FIG. 2F, the display of door control user interface 632 occupies most display 604. As illustrated in FIG. 2F, computer system 600 displays an indication that an operation is being performed, such as "opening," within door control user interface 632. That is, computer system 600 updates the display of door control user interface 632 to indicate that the one or more doors of the external device are opening. In some embodiments, in response to detecting input 605*e*, computer system 600 continues to display navigation user interface 606. In some embodiments, in response to detecting that computer system 600 and/or the external structure has gone from the non-moving state to a moving state, computer system 600 displays one or more user interface elements as described above in relation to FIGS. 2A-2C, and/or computer system 600 configures rotatable input mechanism 616, such that an input directed to rotatable input mechanism 616 would not cause an operation to be perform (e.g., causing the door of the external structure to open) (e.g., an operation that is not directed to changing a sensory characteristic) or a different operation to be perform (e.g., changing the volume which is different from causing the door of the external structure to open) (e.g., an operation that is directed to changing a sensory characteristic).

FIG. 3 is a flow diagram illustrating a method (e.g., process 700) for displaying user interfaces in accordance with some examples. Some operations in process 700 are, optionally, combined, the orders of some operations are, optionally, changed, and some operations are, optionally, omitted.

As described below, process 700 provides an intuitive way for displaying user interfaces. Process 700 reduces the cognitive burden on a user for displaying user interfaces, thereby creating a more efficient human-machine interface. For battery-operated computing devices, enabling a user to display user interfaces faster and more efficiently conserves power and increases the time between battery charges.

In some embodiments, process 700 is performed at a computer system (e.g., 600) that is in communication with a display component (e.g., 604) (e.g., a display screen and/or a touch-sensitive display). In some embodiments, the computer system is a watch, a phone, a tablet, a processor, a head-mounted display (HMD) device, and/or a personal computing device. In some embodiments, the computer system is in communication with one or more cameras (e.g., one or more telephoto, wide angle, and/or ultra-wide-angle cameras). In some embodiments, the computer system is in communication with a physical input mechanism.

The computer system detects (702) presence of a user (e.g., 610) (e.g., a known user, a guest user, and/or a user associated with the computer system and/or a device that is in communication with the computer system).

In response to (704) detecting the presence of the user (e.g., 610) and in accordance with a determination that the computer system (e.g., 600) will be moving within a predetermined period of time (e.g., 1-60 seconds) after (e.g., and/or while) the presence of the user (e.g., 610) was detected (e.g., In some embodiments, a determination that the computer system is currently moving), the computer system displays (706), via the display component (e.g., 604), a user interface (e.g., 612 and/or 632) that includes (e.g., a user interface that was not previously displayed) (e.g., a settings user interface) a first set of one or more controls (e.g., 618*a* and/or 618*b*) (e.g., one or more controls, where selection of the one or more controls cause the computer system to change a temperature, change (e.g., play, pause, increase, decrease, skip, and/or reverse) a characteristic (e.g., playback and/or sound) of media (e.g., music media and/or video media)) corresponding to a first type of setting (e.g., a temperature setting, a media setting, a fan setting, a sound setting, and/or a door setting).

In response to (704) detecting the presence of the user and in accordance with a determination that the computer system (e.g., 600) will not be moving within the predetermined period of time after the presence of the user (e.g., 610) was detected (e.g., In some embodiments, a determination that the computer system is not currently moving), the computer system displays (708), via the display component (e.g., 604), a user interface (e.g., 612 and/or 632) (e.g., a user interface that was not previously displayed) (e.g., the settings user interface) that includes a second set of one or more controls (e.g., 618*a* and/or 618*b*) (e.g., one or more controls, where selection of the one or more controls cause the computer system to open a door and/or close a door) corresponding to a second type of setting (e.g., a door setting and/or a window setting) that is different from the first type of setting (e.g., a temperature setting, a media setting, a fan setting, a sound setting, and/or a door setting), wherein the first set of one or more controls (e.g., 618*a* and/or 618*b*) is different from the second set of one or more controls. In some embodiments, the first set of one or more controls are not displayed while the second set of one or more controls are displayed. Displaying different sets of one or more controls in accordance with a determination of whether the computer system will be moving within the predetermined period of time after the presence of the user was detected allows for such controls to be catered and/or specific to particular contexts (e.g., based on movement of the computer system), thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, detecting the presence of the user (e.g., 610) includes detecting that the user is in a certain position (e.g., a type of position, such as a sitting position and/or a standing position) in a physical environment (e.g., as described above FIG. 2A). In some embodiments, detecting the presence of the user includes detecting that the user is within a predetermined distance (e.g., 0.1-5 meters) from an area of the computer system and/or the physical environment. Detecting that the user is in the certain position to cause different sets of one or more controls to be displayed allows for such controls to be catered and/or specific to particular contexts (e.g., based on the certain position), thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, the computer system (e.g., 600) is in communication with a first display (e.g., 604) (e.g., the display component and/or another display component and/or display that is in communication with the computer system). In some embodiments, detecting the presence of the user (e.g., 610) includes detecting that a body part (e.g., hand, finger, foot, and/or head) of the user is within a predetermined distance (e.g., 0.1-5 meters) from the first display (e.g., as discussed above in FIG. 2A). Detecting that the body part of the user is within the predetermined distance from the display to cause a set of one or more controls to be displayed allows for such controls to be displayed when a user is about to and/or in a position to interact with the controls, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, the computer system (e.g., 600) is in communication with a second display (e.g., 604) (e.g., the display component and/or another display component and/or display that is in communication with the computer system) that is different from the first display. In some embodiments, a body part of the user was detected near the first display and not the second display. In some embodiments, in accordance with a determination that the computer system will be moving within the predetermined period of time after the presence of the user (e.g., 610) was detected, the user interface (e.g., 612 and/or 632) that includes the first set of one or more controls (e.g., 618*a* and/or 618*b*) corresponding to the first type of setting is displayed on the first display. In some embodiments, in accordance with a determination that the computer system will not be moving within the predetermined period of time after the presence of the user was detected, the user interface that includes the second set of one or more controls (e.g., 618*a* and/or 618*b*) corresponding to the second type of setting is displayed on the first display. In some embodiments, in response to detecting the presence of the user the computer system forgoes displaying the user interface that includes the first set of one or more controls (e.g., 618*a* and/or 618*b*) corresponding to the first type of setting on the second display and forgoes displaying the user interface that includes the second set of one or more controls corresponding to the second type of setting on the second display (e.g., as discussed above in FIG. 2B). Not displaying different sets of one or more controls on the second display and displaying such sets of one or more controls on the first display allows for controls to be provided to a user on a display that is closer, more convenient, and/or better for displaying such controls, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, before (e.g., directly before and/or an amount of time before, such as since ceasing display of another user interface in accordance with a determination that the user is no longer detected) detecting presence of the user (e.g., 610), a respective user interface is not displayed via the display component (e.g., 604) (e.g., as described above in FIG. 2B). In some embodiments, the first set of one or more controls are displayed before the second set of one or more controls. In some embodiments, the second set of one or more controls are displayed before the first set of one or more controls. Having a respective user interface not be displayed before detecting presence of the user allows for the computer system to reduce visual pollution from displaying and/or conserve power and/or computing resources when the user is not present, thereby providing improved visual feedback to the user, reducing the number of inputs needed to perform an operation, and/or performing an operation when a set of conditions has been met without requiring further user input.

In some embodiments, a total number of the first set of one or more controls (e.g., 618*a* and/or 618*b*) is greater than a total number of the second set of one or more controls (e.g., 618*a* and/or 618*b*) (e.g., as described above at FIG. 2B). In some embodiments, the second set of one or more controls is greater than the total number of the first set of one or more controls. Displaying more controls in accordance with the determination that the computer system will be moving within the predetermined period of time allows for a user to control more aspects when the computer system is in a particular context and/or when the user is likely to be in a more static state in terms of activity, thereby reducing the number of inputs needed to perform an operation, providing additional control options without cluttering the user interface with additional displayed controls, and/or performing an operation when a set of conditions has been met without requiring further user input.

In some embodiments, the first set of one or more controls (e.g., 618*a* and/or 618*b*) includes a plurality of settings controls. In some embodiments, selection of a respective control of the plurality of settings controls causes the computer system (e.g., 600) to change a sensory characteristic (e.g., temperature, ambient light, and/or sound) of a respective environment (e.g., environment of computer system and/or area within the computer system) (e.g., as described above at FIG. 2C). In some embodiments, the second set of one or more controls do not include a control that, when selected, causes the computer system to change the sensory characteristic (or any sensory characteristic) of the environment. Selection of a respective control of the plurality of settings controls causing the computer system to change a sensory characteristic of a respective environment allows a user to impact the sensory characteristic of the respective environment via the computer system, thereby performing an operation when a set of conditions has been met without requiring further user input.

In some embodiments, the computer system (e.g., 600) is in communication with a device (e.g., a door, an actuator, and/or a window). In some embodiments, the second set of one or more controls (e.g., 618*a* and/or 618*b*) includes a control (e.g., 618*a* and/or 618*b*) that, when selected (e.g., via a tap input, a swipe input, a dragging input, a gaze input, and/or an air gesture and/or input), causes the device to open or close (e.g., as described above in FIG. 2F). The second set of one or more controls including the control that, when selected, causes the device to open or close allows for a user to cause opening or closing in accordance with a determination that the computer system will not be moving within the predetermined period of time, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, the computer system (e.g., 600) is in communication with a first physical input mechanism (e.g., 616) (e.g., a rotatable input mechanism (e.g., a crown, a dial, and/or a knob)). In some embodiments, while displaying the user interface (e.g., 612 and/or 632) that includes the first set of one or more controls (e.g., 618*a* and/or 618*b*) corresponding to the first type of setting, the computer system detects first input (e.g., 605*b*) (e.g., a rotation input (e.g., a twisting input and/or a turning input)) (and, In some embodiments, a non-rotation input, such as a mouse click, gaze input, voice command, air gesture (e.g., a tap air gesture, a pinch gesture, and/or a flicking air gesture)) directed to the first physical input mechanism. In some embodiments, in response to detecting first input directed to the first physical input mechanism, the computer system initiates playback of media or ceasing playback of media (e.g., as described above at FIG. 2B) (e.g., a media file, video media, digital media, and/or audio media). In some embodiments, detecting second input directed to the first physical input mechanism while not displaying the user interface that includes the first set of one or more controls corresponding to the first type of setting causes an operation to be performed that is different from initiating playback of media or ceasing playback of media. In some embodiments, initiating playback of media is performed when media is currently highlighted and/or selected. In some embodiments, initiating playback of media is performed when media is not currently being played. In some embodiments, ceasing playback of media is performed when media is currently being played. In some embodiments, different types of input cause different operations to be performed, such as a first type of input (e.g., a tap and/or selection input) initiates playback of media or ceases playback of media and a second type of input (different from the first type of input) (e.g., a slide and/or movement input) causes a different operation to be performed. The first set of one or more controls including a control that, when selected, initiates playback of media or ceases playback of media allows for a user to control playback of media in accordance with a determination that the computer system will be moving within the predetermined period of time, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, the computer system (e.g., 600) is in communication with a second physical input mechanism (e.g., 616) (e.g., a rotatable input mechanism (e.g., a crown, a dial, and/or a knob)). In some embodiments, while displaying the user interface (e.g., 612 and/or 632) that includes the first set of one or more controls (e.g., 618*a* and/or 618*b*) corresponding to the first type of setting, the computer system detects second input (e.g., 605*b* and/or 605*e*) (e.g., a rotation input (e.g., a twisting input and/or a turning input)) (and, In some embodiments, a non-rotation input, such as a mouse click, gaze input, voice command, air gesture (e.g., a tap air gesture, a pinch gesture, and/or a flicking air gesture)) directed to the second physical input mechanism. In some embodiments, in response to detecting second input directed to the second physical input mechanism and in accordance with a determination that the second input is a first type of input (e.g., a rotation input), the computer system causes a first operation to be performed. In some embodiments, in response to detecting second input directed to the second physical input mechanism and in accordance with a determination that the second input is a second type (e.g., a non-rotation input) of input different from the first type of input, the computer system forgoes causing a respective operation (e.g., the first operation, another operation, and/or any operation such that no operation is performed) to be performed (e.g., as described above at FIG. 2B). The first set of one or more controls not accepting input of a particular type (e.g., in accordance with the determination that the second input is the second type of input, forgoing causing a respective operation to be performed) allows for the computer system to limit what types of input work at different times depending on a context of the computer system, thereby performing an operation when a set of conditions has been met without requiring further user input.

In some embodiments, the computer system (e.g., 600) is in communication with a third physical input mechanism (e.g., 616) (e.g., a rotatable input mechanism (e.g., a crown, a dial, and/or a knob)) and a second device (e.g., a window, a door, a fan, and/or a thermostat). In some embodiments, while displaying the user interface (e.g., 612 and/or 632) that includes the second set of one or more controls (e.g., 618*a* and/or 618*b*) corresponding to the second type of setting, the computer system detects third input (e.g., 605*e* and/or 605*b*) (e.g., a rotation input (e.g., a twisting input and/or a turning input)) (and, In some embodiments, a non-rotation input, such as a mouse click, gaze input, voice command, air gesture (e.g., a tap air gesture, a pinch gesture, and/or a flicking air gesture)) directed to the third physical input mechanism. In some embodiments, in response to detecting third input directed to the third physical input mechanism, the computer system causes a second operation to be performed, wherein the second operation causes a second device to be opened or closed (e.g., as described above at FIGS. 2E and 2F). In some embodiments, different types of input cause different operations to be performed, such as a first type of input (e.g., a non-rotation input) causes the second operation to be performed and a second type of input (different from the first type of input) (e.g., a rotation input) causes a third operation (different from the second operation) to be performed. The second set of one or more controls including a control that, when selected, causes the second device to be opened or closed allows for a user to cause opening or closing in accordance with a determination that the computer system will not be moving within the predetermined period of time, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, the computer system (e.g., 600) is in communication with a fourth physical input mechanism (e.g., 616) (e.g., a hardware input mechanism, a rotatable input mechanism, a crown, a knob, a dial, a physical slider, and/or a hardware button) and a third device (e.g., a watch, a phone, a tablet, a processor, a head-mounted display (HMD) device, and/or a personal computing device). In some embodiments, after detecting presence of the user (e.g., 610), the computer system detects rotation (e.g., a clockwise rotation and/or a counterclockwise rotation) of the fourth physical input mechanism (e.g., as described above at FIG. 2B). In some embodiments, in response to detecting rotation of the fourth physical input mechanism and in accordance with a determination that the computer system will be moving within the predetermined period of time after the presence of the user was detected (e.g., and while the user interface that includes the first set of one or more controls are displayed), the computer system causes output of the third device to be adjusted while displaying the user interface (e.g., 612 and/or 632) that includes the first set of one or more controls (e.g., 618*a* and/or 618*b*) (e.g., as described above at FIG. 2C). In some embodiments, in response to detecting rotation of the fourth physical input mechanism and in accordance with a determination that the computer system will not be moving within the predetermined period of time after the presence of the user was detected (e.g., and while the user interface that includes the first set of one or more controls are displayed), the computer system forgoes causing output of the third device to be adjusted while displaying the user interface that includes the second set of one or more controls (e.g., 618*a* and/or 618*b*) (e.g., as described above at FIG. 2E). Selectively causing (e.g., in accordance with a determination whether the computer system will be moving within the predetermined period of time) output of the third device to be adjusted in response to detecting rotation of the fourth physical input mechanism allows the computer system to selectively detect particular types of input, thereby performing an operation when a set of conditions has been met without requiring further user input.

In some embodiments, the computer system (e.g., 600) is in communication with a fifth physical input mechanism (e.g., 616) (e.g., a hardware input mechanism, a rotatable input mechanism, a crown, a knob, a dial, a physical slider, and/or a hardware button). In some embodiments, while displaying the first set of one or more controls (e.g., 618*a* and/or 618*b*), the computer system is configured to respond to a first set of one or more inputs (e.g., one or more rotation inputs (e.g., a twisting input and/or a turning input)) (and, In some embodiments, one or more non-rotation inputs, such as a mouse click, gaze input, voice command, air gesture (e.g., a tap air gesture, a pinch gesture, and/or a flicking air gesture)) (e.g., as described in FIGS. 2B and 2C). In some embodiments, while displaying the second set of one or more controls (e.g., 618*a* and/or 618*b*), the computer system is configured to respond to a second set of one or more inputs (e.g., one or more rotation inputs (e.g., a twisting input and/or a turning input)) (and, In some embodiments, one or more non-rotation inputs, such as a mouse click, gaze input, voice command, air gesture (e.g., a tap air gesture, a pinch gesture, and/or a flicking air gesture)) that is different from the first set of one or more inputs (e.g., as described in FIGS. 2E and 2F). In some embodiments, while displaying the first set of one or more controls, the computer system is not configured to respond to the second set of one or more inputs. In some embodiments, while displaying the second set of one or more controls, the computer system is not configured to respond to the first set of one or more inputs. Configuring the computer system to respond to a different set of inputs depending on whether the computer system is determined to be moving in the predetermined amount of time allows the computer system to selectively detect particular types of input, thereby performing an operation when a set of conditions has been met without requiring further user input.

In some embodiments, the user interface (e.g., 612 and/or 632) that includes the first set of one or more controls (e.g., 618*a* and/or 618*b*) and the user interface that includes the second set of one or more controls (e.g., 618*a* and/or 618*b*) are only displayed while the presence of the user (e.g., 610) is detected (e.g., as described above at FIG. 2B). Only displaying the user interface that includes the first set of one or more controls and the user interface that includes the second set of one or more controls while the presence of the user is detected allows the computer system to use less power and/or resources while the presence of the user is not detected, thereby providing improved visual feedback to the user, reducing the number of inputs needed to perform an operation, and/or performing an operation when a set of conditions has been met without requiring further user input.

In some embodiments, while displaying the user interface (e.g., 612 and/or 632) that includes the first set of one or more controls (e.g., 618*a* and/or 618*b*) or the user interface that includes the second set of one or more controls (e.g., 618*a* and/or 618*b*), the computer system detects a change in movement of the computer system (e.g., 600). In some embodiments, in response to detecting the change in the movement of the computer system, the computer system ceases to display the first set of one or more controls (e.g., that was displayed before detecting the change in the movement of the computer system) or the user interface that includes the second set of one or more controls (e.g., that was displayed before detecting the change in the movement of the computer system) (e.g., as described above at FIG. 2B). Ceasing to display a user interface that includes a set of one or more controls in response to detecting the change in the movement of the computer system allows the computer system to react to changes, thereby providing improved visual feedback to the user, reducing the number of inputs needed to perform an operation, and/or performing an operation when a set of conditions has been met without requiring further user input.

Note that details of the processes described above with respect to process 700 (e.g., FIG. 3) are also applicable in an analogous manner to other methods described herein. For example, process 800 optionally includes one or more of the characteristics of the various methods described above with reference to process 700. For example, the physical input mechanism described above in relation to process 800 can be configured to perform a respective operation when one or more controls are displayed using the techniques described above in relation to process 700. For brevity, these details are not repeated below.

FIG. 4 is a flow diagram illustrating a method (e.g., process 800) for configuring a device to perform a respective operation in accordance with some examples. Some operations in process 800 are, optionally, combined, the orders of some operations are, optionally, changed, and some operations are, optionally, omitted.

As described below, process 800 provides an intuitive way for configuring a device to perform a respective operation. Process 800 reduces the cognitive burden on a user for configuring a device to perform a respective operation, thereby creating a more efficient human-machine interface. For battery-operated computing devices, enabling a user to configure a device to perform a respective operation faster and more efficiently conserves power and increases the time between battery charges.

In some embodiments, process 800 is performed at a computer system (e.g., 600) that is in communication with a display component (e.g., 604) (e.g., a display screen and/or a touch-sensitive display) and a physical input mechanism (e.g., 616) (e.g., a hardware input mechanism, a rotatable input mechanism, a crown, a knob, a dial, a physical slider, and/or a hardware button). In some embodiments, the computer system is a watch, a phone, a tablet, a processor, a head-mounted display (HMD) device, and/or a personal computing device. In some embodiments, the computer system is in communication with one or more cameras (e.g., one or more telephoto, wide angle, and/or ultra-wide-angle cameras).

The computer system detects (802) presence of a user (e.g., 610).

In response to (804) detecting the presence of the user (e.g., 610) and in accordance with a determination that the computer system (e.g., 600) will be moving within a predetermined period of time after the presence of the user (e.g., 610) was detected (e.g., as described above in relation to process 700), the computer system configures (806) the physical input mechanism (e.g., 616) to cause a first operation to be performed in response to detecting input (e.g., input that corresponds to a rotational input and/or twisting input) (e.g., a tap input and, In some embodiments, a non-tap input, such as a swipe input, a mouse click, a button press, a gaze input, an air gesture input, and/or a gaze input with an air gesture input) (e.g., a physical touch input, a button press, a non-rotational input, and/or an input that causes the physical input mechanism to perform the same operation that is performed when the physical input mechanism is physically touched) directed to the physical input mechanism (e.g., as described above at FIGS. 2B-2C and 2E-2F). In some embodiments, in accordance with a determination that the computer system will be moving within a predetermined period of time after the presence of the user was detected, the computer system displays a first user interface object (e.g., a selectable user interface object, a user interface object that, when selected, causes the first type of setting to be changed and/or causes output (e.g., by a first set of devices and/or computer systems) that is based on the first type of setting to change) that corresponds to the first setting (and that does not correspond to another type of setting).

In response to (804) detecting the presence of the user and in accordance with a determination that the computer system (e.g., 600) will not be moving within the predetermined period of time after the presence of the user (e.g., 610) was detected (e.g., as described above in relation to process 700), the computer system configures (808) the physical input mechanism (e.g., 616) to cause a second operation to be performed in response to detecting the input (e.g., input that corresponds to a rotational input and/or twisting input) (e.g., a tap input and, In some embodiments, a non-tap input, such as a swipe input, a mouse click, a button press, a gaze input, an air gesture input, and/or a gaze input with an air gesture input) (e.g., a physical touch input, a button press, a non-rotational input, and/or an input that causes the physical input mechanism to perform the same operation that is performed when the physical input mechanism is physically touched) directed to the physical input mechanism, wherein the second operation is different from the first operation (e.g., as described above at FIGS. 2B-2C and 2E-2F). In some embodiments, in accordance with a determination that the computer system will not be moving within the predetermined period of time after the presence of the user was detected, the computer system displays a second user interface object (e.g., a selectable user interface object, a user interface object that, when selected, causes the second type of setting to be changed and/or causes output (e.g., by a second set of devices and/or computer systems that is different form the first set of devices and/or computer systems) that is based on the second type of setting to change (e.g., without causing output that is based on the first type of settings to change)) that corresponds to the second type of setting (and that does not correspond to the first type of setting). In some embodiments, the second user interface object is displayed concurrently with the control. In some embodiments, before detecting the input directed to the control, the second user interface object is not displayed and the control is displayed, and in response to detecting the input directed to the control, the computer system displays the second user interface object and ceases to display the control. In some embodiments, the second user interface object is not concurrently displayed with the first user interface object. In some embodiments, the second user interface object includes (and/or is displayed with) an indication that corresponds to the second type of setting and does not include (and/or is not displayed with) an indication of the first type of setting. In some embodiments, the first user interface object includes (and/or is displayed with) the indication that corresponds to the first type of setting and does not include (and/or is not displayed with) the indication of the second type of setting. In some embodiments, in accordance with a determination that the computer system will not be moving within the predetermined period of time after the presence of the user was detected, the physical input mechanism is not configured to perform the first operation in response to detecting the input. In some embodiments, in accordance with a determination that the computer system will not be moving within the predetermined period of time after the presence of the user was detected, the physical input mechanism is not configured to perform the second operation in response to detecting the input. In accordance with a determination of whether the computer system will be moving within the predetermined period of time after the presence of the user was detected, configuring the physical input mechanism to cause different operations to be performed in response to detecting input directed to the physical input mechanism allows the computer system to react differently in different situations and/or contexts that are based on movement of the computer system, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, the physical input mechanism (e.g., 616) is a rotatable input mechanism (e.g., a crown, a knob, and/or a dial).

In some embodiments, detecting the presence of the user (e.g., 610) includes detecting that the user is in a certain position in a physical environment (e.g., as described above in relation to process 700) (e.g., as described above in relation to FIG. 2A). Detecting that the user in the certain position to configure the physical input mechanism to cause different operations to be performed in response to detecting input directed to the physical input mechanism allows for such operations to be catered and/or specific to particular contexts (e.g., based on the certain position), thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, detecting the presence of the user (e.g., 610) includes detecting that a body part of the user is within a predetermined distance from a display (e.g., as described above in relation to FIG. 2A) (e.g., the display component or a separate display and/or another display component) (e.g., as described above in relation to process 700). Detecting that the body part of the user is within the predetermined distance from the display to configure the physical input mechanism to cause different operations to be performed in response to detecting input directed to the physical input mechanism allows for such operations to be performed when a user is about to and/or in a position to want to perform the operations, thereby providing improved visual feedback to the user, reducing the number of inputs needed to perform an operation, providing additional control options without cluttering the user interface with additional displayed controls, and/or performing an operation when a set of conditions has been met without requiring further user input.

In some embodiments, after (and/or while and/or after a predetermined period of time (e.g., 1-60 seconds)) detecting presence of the user (e.g., 610), the computer system detects a first input (e.g., 605*b* and/or 605*e*) (e.g., input that corresponds to a rotational input and/or twisting input) (e.g., a tap input and, In some embodiments, a non-tap input, such as a swipe input, a mouse click, a button press, a gaze input, an air gesture input, and/or a gaze input with an air gesture input) (e.g., a physical touch input, a button press, a non-rotational input, and/or an input that causes the physical input mechanism to perform the same operation that is performed when the physical input mechanism is physically touched) directed to the physical input mechanism. In some embodiments, in response to detecting the first input directed to the physical input mechanism (e.g., 616) and in accordance with a determination that the physical input mechanism is configured to cause the first operation to be performed in response to detecting input directed to the physical input mechanism, the computer system performs the first operation (e.g., without performing the second operation) (e.g., as described above at FIGS. 2C and 2F). In some embodiments, in response to detecting the first input directed to the physical input mechanism and in accordance with the determination that the physical input mechanism is configured to cause the first operation to be performed in response to detecting input directed to the physical input mechanism, the computer system issues a first set of one or more haptics (e.g., 628 and/or 640). In some embodiments, in response to detecting the first input directed to the physical input mechanism (e.g., 616) and in accordance with a determination that the physical input mechanism is configured to cause the second operation to be performed in response to detecting input directed to the physical input mechanism, the computer system performs the second operation (e.g., as described above at FIGS. 2C and 2F) (e.g., without performing the first operation). In some embodiments, in response to detecting the first input directed to the physical input mechanism and in accordance with the determination that the physical input mechanism is configured to cause the second operation to be performed in response to detecting input directed to the physical input mechanism, the computer system issues a second set of one or more haptics (e.g., 628 and/or 640) (e.g., the same or different from the first set of one or more haptics). Issuing a set of one or more haptics when performing an operation allows the user to identify that an operation is being performed without needing to visually see the change, thereby performing an operation when a set of conditions has been met without requiring further user input.

In some embodiments, the first set of one or more haptics (e.g., 628 and/or 640) are different from (e.g., different in intensity, length of output, number of haptics, and/or number of spaces or non-haptic output between haptics in a respective set of haptics) the second set of one or more haptics (e.g., 628 and/or 640) (e.g., as described above in relation to FIG. 2F). Issuing different sets of one or more haptics when performing different operations allows the user to identify which operation is performed via the haptics, thereby performing an operation when a set of conditions has been met without requiring further user input.

In some embodiments, the physical input mechanism (e.g., 616) is configured to cause a first respective operation (e.g., the first operation and/or a different operation) to be performed (e.g., in response to detecting input directed to the physical input mechanism) in response to detecting a first set of one or more inputs (e.g., 605*b* and/or 605*e*) directed to the physical input mechanism. In some embodiments, the physical input mechanism is not configured to cause a second respective operation (e.g., the second operation and/or a different operation) to be performed (e.g., in response to detecting input directed to the physical input mechanism) in response to detecting the first set of one or more inputs directed to the physical input mechanism (e.g., as described above at FIGS. 2C and 2F).

In some embodiments, in accordance with a determination that a user (e.g., 610) is not present, the computer system prevents the physical input mechanism (e.g., 616) from causing a respective operation (e.g., the first operation, the second operation, and/or any operation) to be performed. In some embodiments, the physical input mechanism is only configured to cause a respective operation (e.g., the first operation, the second operation, and/or any operation) to be performed when (e.g., in response to, while, after, and/or after a predetermined amount of time) the presence of the user is detected. In some embodiments, preventing the physical input mechanism from causing the respective operation to be performed includes configuring the physical input mechanism to not perform a respective operation (e.g., in response to input) when a user it not present. In some embodiments, preventing the physical input mechanism from causing the respective operation to be performed includes configuring the physical input mechanism to output feedback (e.g., verbal, audio, or haptic feedback) in response to input but not perform operations other than providing feedback. Preventing the physical input mechanism from causing a respective operation to be performed in accordance with the determination that the user is not present prevents operations from being performed unintentionally, thereby performing an operation when a set of conditions has been met without requiring further user input.

In some embodiments, the first operation is a media operation (e.g., as described above in relation to FIG. 2B) (e.g., pause, play, stop, rewind, and/or fast forwarded). In some embodiments, the second operation is an operation that causes an actuator to be activated (e.g., as described above in relation to FIG. 2F) (e.g., open door, close door, open window, and/or close window). Configuring a media operation to be performed in accordance with a determination that the computer system will be moving within the predetermined period of time and configuring an operation that causes an actuator to be activated to be performed in accordance with a determination that the computer system will not be moving within the predetermined period of time allows operations to be performed that are more relevant to a particular situation, thereby reducing the number of inputs needed to perform an operation, providing additional control options without cluttering the user interface with additional displayed controls, and/or performing an operation when a set of conditions has been met without requiring further user input.

In some embodiments, while the physical input mechanism (e.g., 616) is configured to cause the second operation to be performed in response to detecting input directed to the physical input mechanism, the computer system detects that the computer system (e.g., 600) will be moving within a second predetermined period of time. In some embodiments, in response to detecting that the computer system will be moving within the second predetermined period of time, the computer system configures the physical input mechanism to cause the first operation to be performed in response to detecting input directed to the physical input mechanism (e.g., as described above at FIG. 2E). In some embodiments, while the physical input mechanism is configured to cause the first operation to be performed in response to detecting input directed to the physical input mechanism, the computer system detects that the computer system will not be moving within the second predetermined period of time; and in response to detecting that the computer system will not be moving within the second predetermined period of time, the computer system configures the physical input mechanism to cause the second operation to be performed in response to detecting input directed to the physical input mechanism. Changing configuration of the physical input mechanism in response to detecting that the computer system will be moving within the second predetermined period of time allows the computer system to react to changes in context, thereby reducing the number of inputs needed to perform an operation, providing additional control options without cluttering the user interface with additional displayed controls, and/or performing an operation when a set of conditions has been met without requiring further user input.

Note that details of the processes described above with respect to process 800 (e.g., FIG. 4) are also applicable in an analogous manner to the methods described herein. For example, process 700 optionally includes one or more of the characteristics of the various methods described above with reference to process 800. For example, the physical input mechanism described above in relation to process 800 can be configured to perform a respective operation when one or more controls are displayed using the techniques described above in relation to process 700. For brevity, these details are not repeated below.

This disclosure, for purpose of explanation, has been described with reference to specific embodiments. The discussions above are not intended to be exhaustive or to limit the disclosure and/or the claims to the specific embodiments. Modifications and/or variations are possible in view of the disclosure. Some embodiments were chosen and described in order to explain principles of techniques and their practical applications. Others skilled in the art are thereby enabled to utilize the techniques and various embodiments with modifications and/or variations as are suited to a particular use contemplated.

Although the disclosure and embodiments have been fully described with reference to the accompanying drawings, it is to be noted that various changes and/or modifications will become apparent to those skilled in the art. Such changes and/or modifications are to be understood as being included within the scope of this disclosure and embodiments as defined by the claims.

It is the intent of this disclosure that any personal information of users should be gathered, managed, and handled in a way to minimize risks of unintentional and/or unauthorized access and/or use.

Therefore, although this disclosure broadly covers use of personal information to implement one or more embodiments, this disclosure also contemplates that embodiments can be implemented without the need for accessing such personal information.

What is claimed is:

1. A method, comprising:

at a computer system that is in communication with a display component:

detecting presence of a user; and in response to detecting the presence of the user:

in accordance with a determination that a vehicle is in motion, displaying, via the display component, a user interface that includes a first set of one or more controls corresponding to a first type of setting, wherein the vehicle is separate from the computer system; and in accordance with a determination that the vehicle is not in motion, forgoing display of, via the display component, the user interface that includes the set of one or more controls.

2. The method of claim 1, wherein detecting the presence of the user includes detecting that the user is in a certain position in a physical environment.

3. The method of claim 1, wherein the computer system is in communication with a first display, and wherein detecting the presence of the user includes detecting that a body part of the user is within a predetermined distance from the first display.

4. The method of claim 3, wherein:

the computer system is in communication with a second display that is different from the first display;

in accordance with the determination that the vehicle is in motion, the user interface that includes the first set of one or more controls corresponding to the first type of setting is displayed on the first display; and the method further comprises:

in response to detecting the presence of the user, forgoing displaying the user interface that includes the first set of one or more controls corresponding to the first type of setting on the second display.

5. The method of claim 1, wherein, before detecting presence of the user, a respective user interface is not displayed via the display component.

6. The method of claim 1, wherein the first set of one or more controls includes a plurality of settings controls, and wherein selection of a respective control of the plurality of settings controls causes the computer system to change a sensory characteristic of a respective environment.

7. The method of claim 1, wherein the computer system is in communication with a first physical input mechanism, the method further comprising:

while displaying the user interface that includes the first set of one or more controls corresponding to the first type of setting, detecting first input directed to the first physical input mechanism; and in response to detecting first input directed to the first physical input mechanism, initiating playback of media or ceasing playback of media.

8. The method of claim 1, wherein the computer system is in communication with a second physical input mechanism, the method further comprising:

while displaying the user interface that includes the first set of one or more controls corresponding to the first type of setting, detecting second input directed to the second physical input mechanism; and in response to detecting second input directed to the second physical input mechanism:

in accordance with a determination that the second input is a first type of input, causing a first operation to be performed; and in accordance with a determination that the second input is a second type of input different from the first type of input, forgoing causing a respective operation to be performed.

9. The method of claim 1, wherein the computer system is in communication with a third physical input mechanism and a second device, the method further comprising:

while displaying the user interface that includes the first set of one or more controls corresponding to the first type of setting, detecting third input directed to the third physical input mechanism; and in response to detecting third input directed to the third physical input mechanism, causing a second operation to be performed, wherein the second operation causes the second device to perform an operation.

10. The method of claim 1, wherein the computer system is in communication with a fourth physical input mechanism and a third device, the method further comprising:

after detecting presence of the user, detecting rotation of the fourth physical input mechanism; and in response to detecting rotation of the fourth physical input mechanism:

in accordance with a determination that the vehicle is in motion, causing output of the third device to be adjusted while displaying the user interface that includes the first set of one or more controls; and in accordance with a determination that the vehicle is not in motion, forgoing causing output of the third device to be adjusted.

11. The method of claim 1, wherein:

the computer system is in communication with a fifth physical input mechanism;

while displaying the first set of one or more controls, the computer system is configured to respond to a first set of one or more inputs; and while forgoing display of the first set of controls, the computer system is configured to respond to a second set of one or more inputs that is different from the first set of one or more inputs.

12. The method of claim 1, wherein the user interface that includes the first set of one or more controls is only displayed while the presence of the user is detected.

13. The method of claim 1, further comprising:

while displaying the user interface that includes the first set of one or more controls, detecting that the vehicle is not in motion; and in response to detecting that the vehicle is not in motion, ceasing to display the first set of one or more controls.

14. A non-transitory computer-readable storage medium storing one or more programs configured to be executed by one or more processors of a computer system that is in communication with a display component, the one or more programs including instructions for:

detecting presence of a user; and in response to detecting the presence of the user:

in accordance with a determination that a vehicle is in motion, displaying, via the display component, a user interface that includes a first set of one or more controls corresponding to a first type of setting, wherein the vehicle is separate from the computer system; and in accordance with a determination that the vehicle is not in motion, forgoing display of, via the display component, the user interface that includes the set of one or more controls.

15. A computer system that is in communication with a display component, comprising:

one or more processors; and memory storing one or more programs configured to be executed by the one or more processors, the one or more programs including instructions for:

detecting presence of a user; and in response to detecting the presence of the user:

in accordance with a determination that a vehicle is in motion, displaying, via the display component, a user interface that includes a first set of one or more controls corresponding to a first type of setting, wherein the vehicle is separate from the computer system; and in accordance with a determination that the vehicle is not in motion, forgoing display of, via the display component, the user interface that includes the set of one or more controls.

16. The non-transitory computer-readable storage medium of claim 14, wherein detecting the presence of the user includes detecting that the user is in a certain position in a physical environment.

17. The non-transitory computer-readable storage medium of claim 14, wherein the computer system is in communication with a first display, and wherein detecting the presence of the user includes detecting that a body part of the user is within a predetermined distance from the first display.

18. The non-transitory computer-readable storage medium of claim 17, wherein:

the computer system is in communication with a second display that is different from the first display;

in accordance with the determination that the vehicle is in motion, the user interface that includes the first set of one or more controls corresponding to the first type of setting is displayed on the first display; and the one or more programs including instructions for:

in response to detecting the presence of the user, forgoing displaying the user interface that includes the first set of one or more controls corresponding to the first type of setting on the second display.

19. The non-transitory computer-readable storage medium of claim 14, wherein, before detecting presence of the user, a respective user interface is not displayed via the display component.

20. The non-transitory computer-readable storage medium of claim 14, wherein the first set of one or more controls includes a plurality of settings controls, and wherein selection of a respective control of the plurality of settings controls causes the computer system to change a sensory characteristic of a respective environment.

21. The non-transitory computer-readable storage medium of claim 14, wherein the computer system is in communication with a first physical input mechanism, the one or more programs including instructions for:

while displaying the user interface that includes the first set of one or more controls corresponding to the first type of setting, detecting first input directed to the first physical input mechanism; and in response to detecting first input directed to the first physical input mechanism, initiating playback of media or ceasing playback of media.

22. The non-transitory computer-readable storage medium of claim 14, wherein the computer system is in communication with a second physical input mechanism, the one or more programs including instructions for:

while displaying the user interface that includes the first set of one or more controls corresponding to the first type of setting, detecting second input directed to the second physical input mechanism; and in response to detecting second input directed to the second physical input mechanism:

in accordance with a determination that the second input is a first type of input, causing a first operation to be performed; and in accordance with a determination that the second input is a second type of input different from the first type of input, forgoing causing a respective operation to be performed.

23. The non-transitory computer-readable storage medium of claim 14, wherein the computer system is in communication with a third physical input mechanism and a second device, the one or more programs including instructions for:

while displaying the user interface that includes the first set of one or more controls corresponding to the first type of setting, detecting third input directed to the third physical input mechanism; and in response to detecting third input directed to the third physical input mechanism, causing a second operation to be performed, wherein the second operation causes the second device to perform an operation.

24. The non-transitory computer-readable storage medium of claim 14, wherein the computer system is in communication with a fourth physical input mechanism and a third device, the one or more programs including instructions for:

after detecting presence of the user, detecting rotation of the fourth physical input mechanism; and in response to detecting rotation of the fourth physical input mechanism:

in accordance with a determination that the vehicle is moving, causing output of the third device to be adjusted while displaying the user interface that includes the first set of one or more controls; and in accordance with a determination that the vehicle is not moving, forgoing causing output of the third device to be adjusted.

25. The non-transitory computer-readable storage medium of claim 14, wherein:

the computer system is in communication with a fifth physical input mechanism;

while displaying the first set of one or more controls, the computer system is configured to respond to a first set of one or more inputs; and while forgoing display of the first set of controls, the computer system is configured to respond to a second set of one or more inputs that is different from the first set of one or more inputs.

26. The non-transitory computer-readable storage medium of claim 14, wherein the user interface that includes the first set of one or more controls is only displayed while the presence of the user is detected.

27. The non-transitory computer-readable storage medium of claim 14, the one or more programs including instructions for:

while displaying the user interface that includes the first set of one or more controls, detecting that the vehicle is not in motion; and in response to detecting that the vehicle is not in motion, ceasing to display the first set of one or more controls.

28. The computer system of claim 15, wherein detecting the presence of the user includes detecting that the user is in a certain position in a physical environment.

29. The computer system of claim 15, wherein the computer system is in communication with a first display, and wherein detecting the presence of the user includes detecting that a body part of the user is within a predetermined distance from the first display.

30. The computer system of claim 29, wherein:

the computer system is in communication with a second display that is different from the first display;

in accordance with the determination that the vehicle is in motion, the user interface that includes the first set of one or more controls corresponding to the first type of setting is displayed on the first display; and the one or more programs including instructions for:

in response to detecting the presence of the user, forgoing displaying the user interface that includes the first set of one or more controls corresponding to the first type of setting on the second display.

31. The computer system of claim 15, wherein, before detecting presence of the user, a respective user interface is not displayed via the display component.

32. The computer system of claim 15, wherein the first set of one or more controls includes a plurality of settings controls, and wherein selection of a respective control of the plurality of settings controls causes the computer system to change a sensory characteristic of a respective environment.

33. The computer system of claim 15, wherein the computer system is in communication with a first physical input mechanism, the one or more programs including instructions for:

while displaying the user interface that includes the first set of one or more controls corresponding to the first type of setting, detecting first input directed to the first physical input mechanism; and in response to detecting first input directed to the first physical input mechanism, initiating playback of media or ceasing playback of media.

34. The computer system of claim 15, wherein the computer system is in communication with a second physical input mechanism, the one or more programs including instructions for:

while displaying the user interface that includes the first set of one or more controls corresponding to the first type of setting, detecting second input directed to the second physical input mechanism; and in response to detecting second input directed to the second physical input mechanism:

in accordance with a determination that the second input is a first type of input, causing a first operation to be performed; and in accordance with a determination that the second input is a second type of input different from the first type of input, forgoing causing a respective operation to be performed.

35. The computer system of claim 15, wherein the computer system is in communication with a third physical input mechanism and a second device, the one or more programs including instructions for:

while displaying the user interface that includes the first set of one or more controls corresponding to the first type of setting, detecting third input directed to the third physical input mechanism; and in response to detecting third input directed to the third physical input mechanism, causing a second operation to be performed, wherein the second operation causes the second device to perform an operation.

36. The computer system of claim 15, wherein the computer system is in communication with a fourth physical input mechanism and a third device, the one or more programs including instructions for:

after detecting presence of the user, detecting rotation of the fourth physical input mechanism; and in response to detecting rotation of the fourth physical input mechanism:

in accordance with a determination that the vehicle is moving, causing output of the third device to be adjusted while displaying the user interface that includes the first set of one or more controls; and in accordance with a determination that the vehicle is not moving, forgoing causing output of the third device to be adjusted.

37. The computer system of claim 15, wherein:

the computer system is in communication with a fifth physical input mechanism;

while displaying the first set of one or more controls, the computer system is configured to respond to a first set of one or more inputs; and while forgoing display of the first set of controls, the computer system is configured to respond to a second set of one or more inputs that is different from the first set of one or more inputs.

38. The computer system of claim 15, wherein the user interface that includes the first set of one or more controls is only displayed while the presence of the user is detected.

39. The computer system of claim 15, further comprising:

while displaying the user interface that includes the first set of one or more controls, detecting that the vehicle is not moving; and in response to detecting that the vehicle is not moving, ceasing to display the first set of one or more controls.

* * * * *